United States Patent
Bird et al.

(10) Patent No.: US 8,528,945 B2
(45) Date of Patent: Sep. 10, 2013

(54) SPLIT-RING GLAND PIPE COUPLING WITH CORRUGATED ARMOR AND ANNULAR GASKET HAVING PRESSURE ASSIST SLOT

(75) Inventors: Edwin A. Bird, Ashdown, AR (US); Travis Scott Moss, Texarkana, TX (US)

(73) Assignee: Sensus USA Inc., Raleigh, NC (US)

( * ) Notice: Subject to any disclaimer, the term of this patent is extended or adjusted under 35 U.S.C. 154(b) by 0 days.

(21) Appl. No.: 13/361,282

(22) Filed: Jan. 30, 2012

(65) Prior Publication Data

US 2013/0193685 A1 Aug. 1, 2013

(51) Int. Cl.
*F16L 17/00* (2006.01)

(52) U.S. Cl.
USPC .......................... 285/369; 285/110

(58) Field of Classification Search
USPC ................. 285/417, 369, 420; 29/525.02
See application file for complete search history.

(56) References Cited

U.S. PATENT DOCUMENTS

| | | | |
|---|---|---|---|
| 293,734 A | 2/1884 | Harrison | |
| 2,269,664 A | 3/1941 | Hallerberg | |
| 2,491,004 A | 6/1947 | Graham | |
| 2,541,205 A | 2/1951 | Christophersen | |
| 2,741,497 A | 4/1956 | Risley | |
| 2,937,037 A | 5/1960 | Woolsey | |
| 2,985,291 A | 5/1961 | Schoepe et al. | |
| 3,029,946 A | 4/1962 | Wright, Jr. et al. | |
| 3,124,367 A | 3/1964 | Kaynor | |
| 3,233,907 A | 2/1966 | Stanton | |
| 3,315,970 A | 4/1967 | Holloway | |
| 3,432,189 A * | 3/1969 | Buller ........................... | 285/369 |
| 3,485,515 A | 12/1969 | Frishof | |
| 3,486,772 A | 12/1969 | Elsner | |
| 3,680,894 A | 8/1972 | Young | |
| 3,724,878 A | 4/1973 | Ford | |
| 3,727,951 A | 4/1973 | Shire et al. | |
| 3,877,733 A | 4/1975 | Straub | |
| 4,163,571 A | 8/1979 | Nash | |
| 4,362,323 A | 12/1982 | Lodder et al. | |
| 4,421,347 A | 12/1983 | Kantor | |
| 4,471,979 A | 9/1984 | Gibb et al. | |
| 4,480,860 A | 11/1984 | Foresta et al. | |
| 4,538,841 A | 9/1985 | Royston | |
| 4,606,565 A | 8/1986 | Royston | |

(Continued)

OTHER PUBLICATIONS

Five views of Hymax 16 Coupling (5 pages).

(Continued)

*Primary Examiner* — David E Bochna
(74) *Attorney, Agent, or Firm* — Wood, Herron & Evans, LLP

(57) ABSTRACT

A pipe coupling for coupling adjacent ends of a pair of pipes includes a sleeve, a split-ring gland positioned around one of the ends of the sleeve, and an annular gasket positioned within the split-ring gland and configured to be compressed by the split-ring gland for sealing one pipe end to the sleeve. The split-ring gland includes two partially circular gland members with spaced ends defining a gap, which is spanned by an armor positioned in the gap to provide a generally closed annular periphery about the gasket. The armor includes a corrugated portion engaging the gasket during compression. The gasket includes a pressure assist slot configured to receive pressurized fluid leaking from the pipes and a plurality of cross grooves ensuring continued fluid communication with the pressure assist slot. The gasket also includes ribs engaging the split-ring gland and the armor to reduce or eliminate added lubrication necessary.

17 Claims, 14 Drawing Sheets

(56) References Cited

U.S. PATENT DOCUMENTS

| | | | |
|---|---|---|---|
| 4,824,148 | A | 4/1989 | Grabowski |
| 5,069,490 | A | 12/1991 | Halen, Jr. |
| 5,203,594 | A | 4/1993 | Straub |
| 5,257,834 | A | 11/1993 | Zeidler et al. |
| 5,314,213 | A | 5/1994 | Heister et al. |
| 5,476,292 | A | 12/1995 | Harper |
| 5,560,656 | A | 10/1996 | Okamura et al. |
| 5,941,576 | A | 8/1999 | Krausz |
| 6,168,210 | B1 | 1/2001 | Bird |
| 6,293,556 | B1 | 9/2001 | Krausz |
| 7,243,955 | B2 | 7/2007 | Krausz et al. |
| 7,571,940 | B2 * | 8/2009 | Krausz et al. ............ 285/421 |
| 7,625,018 | B2 * | 12/2009 | Krausz et al. ............ 285/420 |
| 7,654,586 | B2 * | 2/2010 | Krausz et al. ............ 285/369 |
| 7,997,626 | B2 * | 8/2011 | Krausz et al. ............ 285/369 |
| 2007/0024056 | A1 * | 2/2007 | Borland ............ 285/369 |
| 2009/0189392 | A1 * | 7/2009 | Ignaczak ............ 285/420 |
| 2010/0314864 | A1 | 12/2010 | Lemke et al. |

OTHER PUBLICATIONS

Pending, related U.S. Appl. No. 13/028,287, filed Feb. 16, 2011 (not published to date) (48 pages).

Five photographic views of commercial gasket sold with Krausz pipe couplings (5 pages total, pictures taken in Mar. 2013), understood to be those described in U.S. Patent No. 7,243,955 and U.S. Patent No. 5,941,576.

* cited by examiner

SPLIT-RING GLAND PIPE COUPLING WITH CORRUGATED ARMOR AND ANNULAR GASKET HAVING PRESSURE ASSIST SLOT

FIELD OF THE INVENTION

The present invention relates generally to pipe couplings and joints and, more particularly, to pipe couplings adapted to couple and seal adjacent ends of two pipe sections of the same or different diameters.

BACKGROUND OF THE INVENTION

Conventional pipe couplings for coupling and sealing adjacent ends of two pipe sections include a coupling sleeve or collar with each pipe end extending into a respective end of the coupling sleeve. A gasket is held adjacent each end of the sleeve overlying the pipe section. An annular flange or gland is associated with each gasket and end of the sleeve, and is tightened to draw down the gasket against the pipe end thus sealing the pipe coupling thereto. One pipe coupling is shown in my prior U.S. Pat. No. 6,168,210 and utilizes continuous flanges that are coupled together via bolts spanning the sleeve. The flanges, sleeve ends, and gaskets have particular relationships that affect the seal and allow the coupling to work over a range of pipe sizes to compress the gaskets against the pipe ends as the flanges are drawn towards each other.

While the continuous flange type of pipe coupling is considered to be particularly advantageous, another style of pipe coupling is proposed in which each flange is provided by a split-ring gland that presents spaced apart confronting ends which can be drawn together with a bolt to close down on the associated gasket. As a consequence, it is not necessary to have bolts that span the sleeve, nor cause the glands to move towards each other. Instead, each end of the sleeve can be independently coupled to the respective pipe end.

In order to work over a range of pipe diameters, the split-ring gland is sized such that it circumscribes most of the circumference of the sleeve end and gasket, but not that portion in the gap defined between the spaced apart confronting ends. However, it is important that the gasket not be exposed radially out of that gap as it will then be a source of leakage and/or failure during installation. To that end, the split-ring gland type of pipe coupling includes a bridge plate or "armor" spanning the gap over the gasket and extending into the gland at each end of the armor. The armor is shaped to conform to the arc of the gland and gasket so as to, in effect, define a continuation of the gasket-confronting surface of the gland. Thus, as the gland is closed down, the gasket will shift and seat throughout the combined circumference of the gland and the armor in order to facilitate installation and create the desired seal.

The gasket inserted into the split-ring gland is an annular gasket generally defining an outer circumferential surface facing the split-ring gland, an inner circumferential surface facing the pipe, and outer and inner side surfaces. One such gasket is provided with a generally annular pressure assist slot extending into the body of the gasket with an opening along the inner side surface of the gasket. Any pressurized fluid that may leak from the pipe along the inner side surface is collected into the pressure assist slot through the opening thereof at the inner side surface. The collected pressurized fluid within the pressure assist slot forces the gasket to expand outwardly to produce a better sealing contact with the pipe, the split-ring gland, and the armor.

As the gland is tightened, however, the opening of the pressure assist slot may be clamped down and closed off, thereby blocking flow of pressurized fluid into the pressure assist slot. It has been proposed to include separate vent holes along the inner side surface spaced radially outwardly from the opening of the pressure assist slot and tunneling through the gasket body into communication with an interior portion of the pressure assist slot beyond the opening. Inclusion of such vent holes can present drawbacks both in the use and in the manufacture of the gaskets.

SUMMARY OF THE INVENTION

The present invention in one aspect includes an improved annular gasket that provides the advantages of vent holes but without their drawbacks. To that end, and in accordance with certain principles of the present invention, the inner side surface of the gasket is provided with one or more cross grooves in the form of indentations adjacent to and extending into the opening of the pressure assist slot at the inner side surface. Each of the cross grooves defines a radially extending pathway from the slot opening along the inner side surface, but is recessed beyond the inner side surface so as to provide a fluid communication path into the interior portion of the pressure assist slot even if the opening of the pressure assist slot is clamped shut by compression of the gasket with a split-ring gland. The cross grooves can be formed when the gasket is molded by the same structure used to form the pressure assist slot, making the manufacturing process easier, more reliable, and less costly than inclusion of separate vent holes. Moreover, because the cross grooves extend immediately from the opening, there is less risk that they might become blocked by the rest of the structure of the pipe coupling as might occur with the vent holes.

The present invention in another aspect provides an improved armor for the split-ring gland type of pipe couplings. The conventional armor is cold formed of stainless steel and presents a generally flat, smooth surface to the outer periphery of the gasket. In accordance with the principles of the present invention, at least a portion of the gasket confronting surface is corrugated, i.e., it is provided a plurality of corrugations extending along the surface. The corrugations improves the performance of the armor and, unexpectedly, also enhances the assembly of the pipe coupling. In that regard, the corrugations are advantageously instilled by cold working and therefore provides both increased bending stiffness and tensile strength to the armor as compared to conventional armors.

Also, during installation with conventional armors, the gasket would tend to "bunch up" at the ends of the armor, making it difficult to properly install the pipe coupling. In fact, the gasket and possibly the armor might have to be heavily lubricated to facilitate the shifting of the gasket as the split-ring gland is compressed to help reduce the risk of bunching. But the lubrication further hampers installation as the components are more difficult to handle and can hold dirt and other debris to the parts which is undesirable. Moreover, bunching was not always avoided even with lubrication. Unexpectedly, the corrugations of the armor according to the present invention reduces or eliminates the tendency of the gasket to bunch up thereagainst and also allows the gasket to more readily shift as it is compressed by the gland. As a result, the need for lubrication may be reduced, if not eliminated, thus further facilitating installation of the split-ring gland type of coupling.

In accordance with another aspect of the present invention, the annular gasket may include ribs projecting outwardly from the outer circumferential surface and the inner and outer side surfaces. The ribs enhance the sealing performance of the annular gasket by providing a reliable sealing contact between the various surfaces of the annular gasket and the corresponding surfaces of the split-ring gland. Additionally, the ribs also reduce the frictional contact between the annular gasket and the split-ring gland, thereby reducing the tendency of the annular gasket to "bunch up" against the gland or an armor as described above when the annular gasket is compressed into sealing contact with a pipe end. To this end, the ribs reduce the need for lubrication between the annular gasket and the split-ring gland. Moreover, the combination of the corrugations of the armor, the ribs of the annular gasket, and the fluid in the pressure assist slot may collectively eliminate the likelihood that the gasket will bunch up on the armor during compression of the gasket. As a result, the need for added lubrication may be eliminated, thus further facilitating installation of the split-ring gland type of coupling.

With some split-ring type of pipe couplings, the gland may be formed as a unitary ring, but must be made of sufficiently flexible material that the spaced apart ends at the gap can be stretched or pulled apart to open up the gap in order to fit the gland onto the flange end of the sleeve. That design presents various drawbacks. Another proposal is to instead couple the abutting ends of two gland members by a fastener extending parallel to the longitudinal axis of the gland so that the gland members may "scissor" thereabout to increase the spacing of the gap from its nominal size for purposes of mounting the gland to the flange end of the sleeve. While the scissoring approach may facilitate assembly, for example, while using desirably more rigid materials, the ability of the gland members to scissor presents its own drawbacks. To that end, and in accordance with a second aspect of the present invention, the split-ring gland of the present invention utilizes two gland members, but securely couples them along one side with a fastener oriented tangential to the gland members. As a consequence, more rigid materials may be used, but without the disadvantage of scissoring.

Further, some split ring type of pipe couplings utilize a gasket having a plurality of layers integrally connected to each other. The inner layer typically defines an opening adapted to receive small pipe ends therethrough. Where it is desired to couple to a larger pipe end than can fit through the inner layer opening, one or more of the layers may be torn off the gasket to increase the size of the opening through the gasket to accommodate that larger pipe. Situations arise where the smaller diameter opening provided by the inner layer(s) was desired. But the torn-off layer(s) cannot be reused necessitating that the gasket be discarded and replaced with an entirely new gasket. In accordance with a third aspect of the present invention, a gasket is provided that is comprised of two separate and reusably coupled layers. To that end, the gasket advantageously includes an outer gasket and an inner gasket including corresponding interdigitated surfaces adapted to reusably couple the outer gasket and the inner gasket. The inner gasket may be wider axially than the outer gasket such that the inner gasket includes lips that may be gripped for pulling the inner gasket interdigitations radially inwardly and away from the outer gasket interdigitations. The interdigitations may be symmetrical along an axial direction such that the inner gasket may be re-coupled with the outer gasket in a different orientation rotated 180 degrees from an original orientation of the inner gasket.

The foregoing and other advantages of the present invention will be apparent in light of the accompanying drawings and detailed description thereof.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiment given below, serve to explain the principles of the present invention.

DETAILED DESCRIPTION OF THE INVENTION

Figure 1:
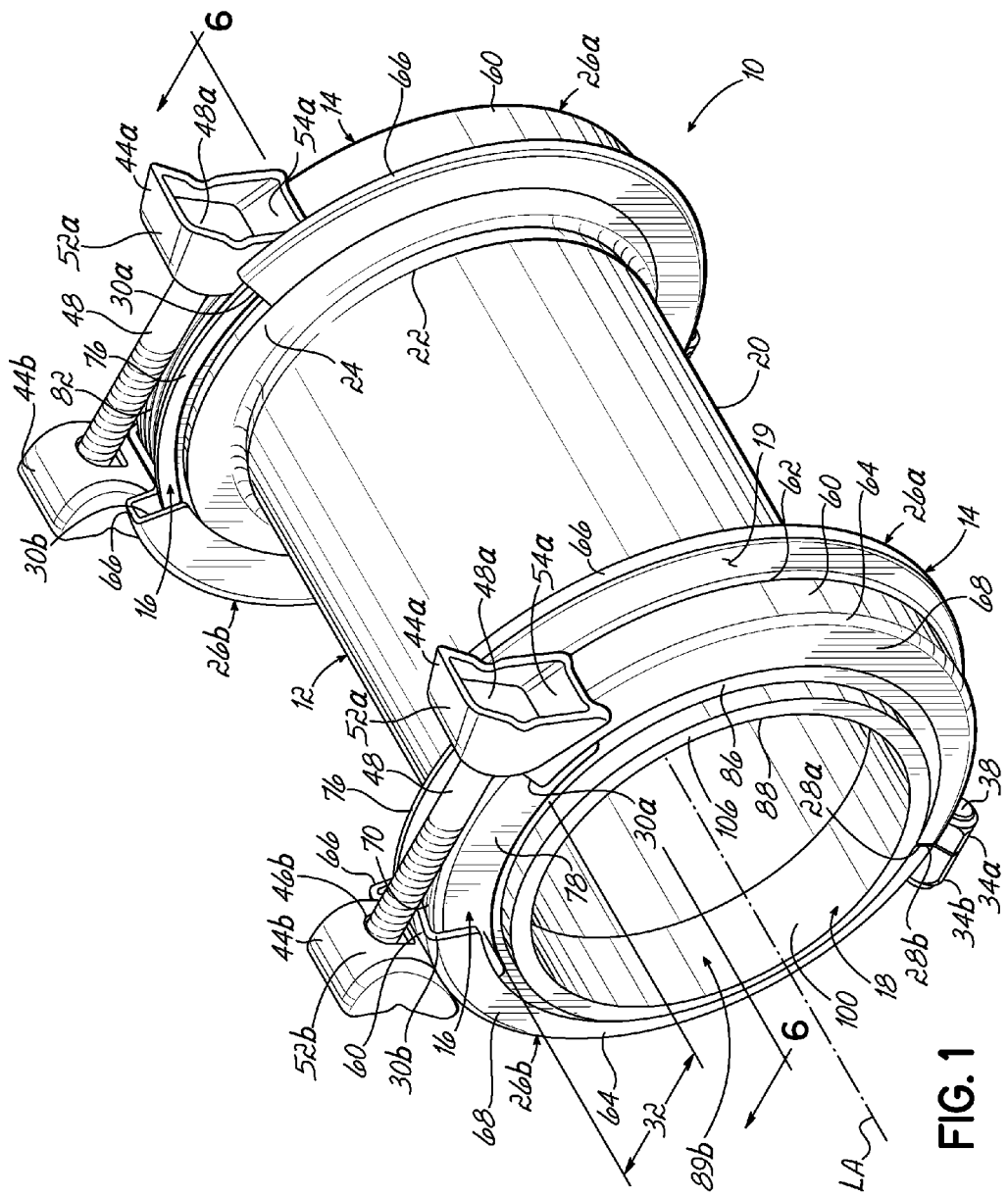
FIG. 1 is a perspective view of a first embodiment of a pipe coupling utilizing armors in accordance with the principles of the present invention.
Figure 2:
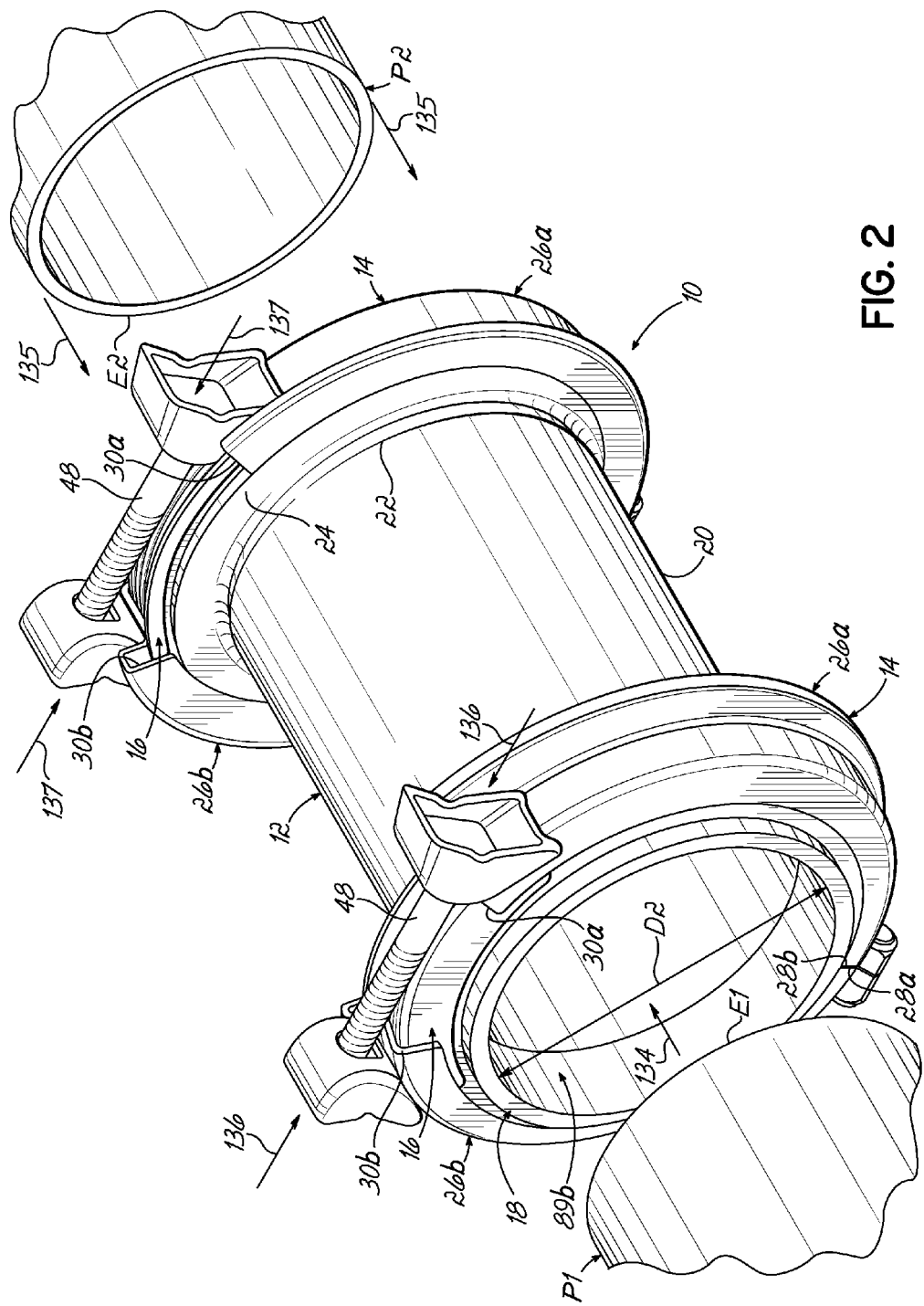
FIG. 2 is a perspective view of the pipe coupling of FIG. 1 for purposes of describing the use of the pipe coupling to sealingly couple two pipes in fluid communication.

With reference to FIGS. 1 and 2, a split-ring gland type of pipe coupling 10 according to one embodiment of the present invention is shown. The pipe coupling 10 includes a sleeve 12, a pair of split-ring glands 14, a bridge plate or armor 16 associated with each split-ring gland 14, and an annular gasket 18 associated with each split-ring gland 14. In the fully assembled state of the pipe coupling 10, an end E1 of a first pipe P1 is inserted into the sleeve 12 through one of the split-ring glands 14 and the corresponding gasket 18, and an end E2 of a second pipe P2 is inserted into the other split-ring gland 14 and associated gasket 18. The split-ring glands 14 are configured to be tightened onto the corresponding gaskets 18 to compress the gaskets 18 into sealing connection with the respective pipe ends E1, E2. The split-ring gland 14 and the armor 16 collectively define a generally closed annular periphery 19 around the gasket 18, which further ensures that fluid passing through the pipes P1, P2 and the pipe coupling 10 does not leak past the gasket 18 out of the pipe coupling 10. Thus, the pipe coupling 10 provides a sealed coupling of two adjacent pipe ends E1, E2 in fluid communication.

Figure 3:
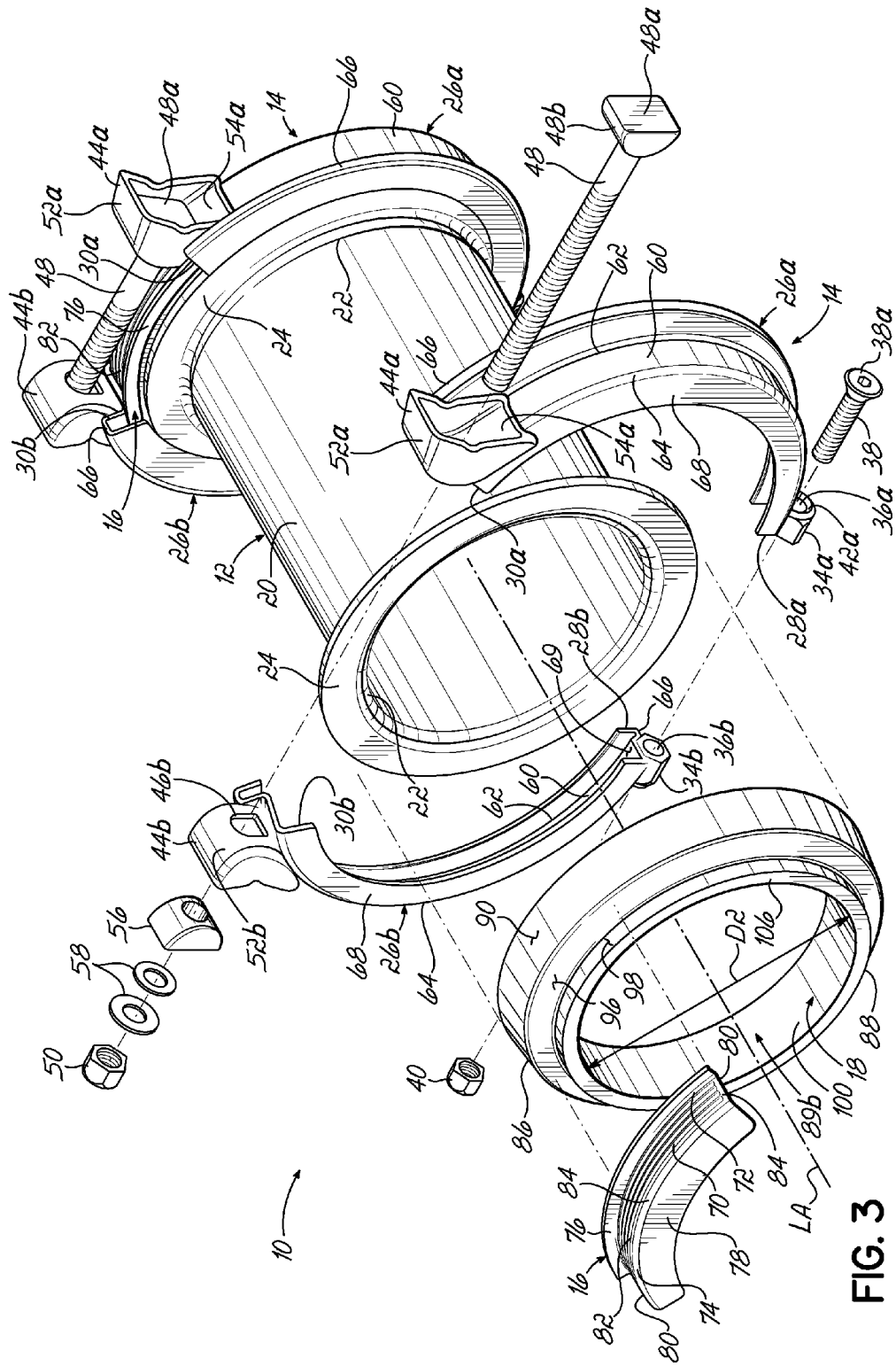
FIG. 3 is partially-exploded perspective view of the pipe coupling of FIG. 1.

Further details of the components of the pipe coupling 10 are shown in FIG. 3, in which one of the split-ring glands 14 is shown partially exploded to facilitate discussion. The sleeve 12 includes a generally cylindrical body portion 20 defining a longitudinal axis LA of the pipe coupling 10 and having opposing open ends 22. At each of the opposing ends 22, the sleeve 12 further includes a radially outwardly-directed flange 24 that is used to accurately locate the split-ring gland 14 and the annular gasket 18, as described in further detail below. Although the sleeve 12 of the exemplary embodiment is shown as cylindrical, it will be understood that the body portion 20 of the sleeve may also be tapered slightly inwardly adjacent both open ends 22 to provide clearance for slight angles between the pipe ends E1, E2 to be coupled in fluid communication by the pipe coupling 10.

Each of the split-ring glands 14 includes a first partially-circular gland member 26a and a second partially-circular gland member 26b. The gland members 26a, 26b each define a half-moon shape and are configured to be centered about the longitudinal axis LA of the pipe coupling 10. The gland members 26a, 26b include respective abutting ends 28a, 28b and respective spaced ends 30a, 30b. The abutting ends 28a, 28b are configured to be securely coupled together in generally gap-free relationship as shown in FIG. 1. With the abutting ends 28a, 28b securely coupled, the spaced ends 30a, 30b define a nominal gap 32 therebetween. To this end, the abutting end 28a of the first gland member 26a includes a first abutting bolt flange 34a projecting radially outwardly from the abutting end 28a. Similarly, the abutting end 28b of the second gland member 26b includes a second abutting bolt flange 34b projecting radially outwardly from the abutting end 28b.

The first and second abutting bolt flanges 34a, 34b include corresponding apertures 36a, 36b oriented tangential to the axis LA and configured to receive a fastener, for example, the bolt 38 and nut 40 shown in FIG. 3. The bolt 38 extends through the apertures 36a, 36b and is coupled to nut 40, such that the bolt 38 and the nut 40 are also oriented generally tangential to the split-ring gland 14 in the illustrated embodiment of the pipe coupling 10. Consequently, when the bolt 38 and nut 40 securely couple the abutting ends 28a, 28b, the gland members 26a, 26b are restrained from pivotally rotating relative to each other thereat such that the ends 30a, 30b are restrained from scissoring apart beyond the nominal gap 32. The nominal gap 32 described above is thus generally considered the maximum length of gap of the split-ring gland 14. The first and second abutting bolt flanges 34a, 34b may be provided with opposing countersinks (only 42a shown in FIG. 3) facing away from one another and configured to receive the head 38a of the bolt 38 and the nut 40 generally flush with the structure of the first and second bolt flanges 34a, 34b. However, the first and second abutting bolt flanges 34a, 34b may be securely coupled by alternative fasteners or may include internal threading at the apertures 36a, 36b in other embodiments. Furthermore, the first and second abutting bolt flanges 34a, 34b may be modified to be plate-shaped or another appropriate flange shape as well understood in the art.

The first and second gland members 26a, 26b also include spaced bolt flanges 44a, 44b at the respective spaced ends 30a, 30b. The spaced bolt flanges 44a, 44b project radially outwardly from the spaced ends 30a, 30b of the first and second gland members 26a, 26b. The spaced bolt flanges 44a, 44b include corresponding apertures (only 46b shown in FIG. 3) configured to receive an adjustable fastener such as the elongate bolt 48 and nut 50 shown in FIG. 3. In this regard, the nut 50 may be tightened on the elongate bolt 48 to draw the spaced bolt flanges 44a, 44b and the spaced ends 30a, 30b closer together from the nominal position to a tightened position, to thereby compress the annular gasket 18 onto one of the pipe ends E1, E2. With the ends 28a, 28b secured together as described above, tightening of the nut 50 advantageously uniformly closes down the gland members 26a, 26b about the annular gasket 18. The elongate bolt 48 and nut 50 are oriented generally tangential to the split-ring gland 14 in the illustrated embodiment of the pipe coupling 10. It will be appreciated that the spaced bolt flanges 44a, 44b may be coupled by alternative known fasteners.

Each of the spaced bolt flanges 44a, 44b includes a convex arcuate surface 52a, 52b facing the gap 32 between the spaced ends 30a, 30b and a concave arcuate surface (only 54a shown in FIG. 3) facing away from the gap 32. The head 48a of the elongate bolt 48 includes an arcuate surface 48b configured to be received in the concave arcuate surface 54a of the first spaced bolt flange 44a. A spacer 56 disposed adjacent the nut 50 also includes an arcuate surface 56a configured to be received in the concave arcuate surface of the second spaced bolt flange 44b. Consequently, when the nut 50 is tightened on the elongate bolt 48, the engagement of the head 48a of the elongate bolt 48 with the first spaced bolt flange 44a and the engagement of the spacer 56 with the second spaced bolt flange 44b hold the elongate bolt 48 in position with respect to the split-ring gland 14. One or more plastic or metal washers 58 may also be provided between the spacer 56 and the nut 50.

The first and second gland members 26a, 26b each include a partially-cylindrical annular wall 60 with an inner edge 62 and an outer edge 64. The partially-cylindrical annular walls 60 are generally flat rather than concave in cross section. The first and second gland members 26a, 26b each further include an inwardly-directed U-shaped wall 66 at the inner edge 62 of the annular wall 60. The U-shaped walls 66 are configured to receive the flange 24 at the end 22 of the sleeve 12, thereby accurately locating the split-ring gland 14 on the sleeve 12. The first and second gland members 26a, 26b each also include an outer wall 68 extending inwardly in a radial direction at the outer edge 64. As described in further detail below, at least a portion of the annular gasket 18 is captured between the outer walls 68 and the flange 24 of the sleeve 12. Thus, the annular walls 60, the outer walls 68, and the flange 24 of the sleeve 12 collectively define a gasket seat 69 for the split-ring gland 14. In the exemplary embodiment shown, the split-ring gland 14 may be tightened between a minimum diameter of about 10.00 inches ±0.13 inches and a maximum diameter of about 10.81 inches±0.25 inches. The sleeve 12 and the split-ring gland 14 are each formed from carbon steel in one embodiment, but these components may alternatively be formed from stainless steel, plastic, or another structural material.

Figure 4:
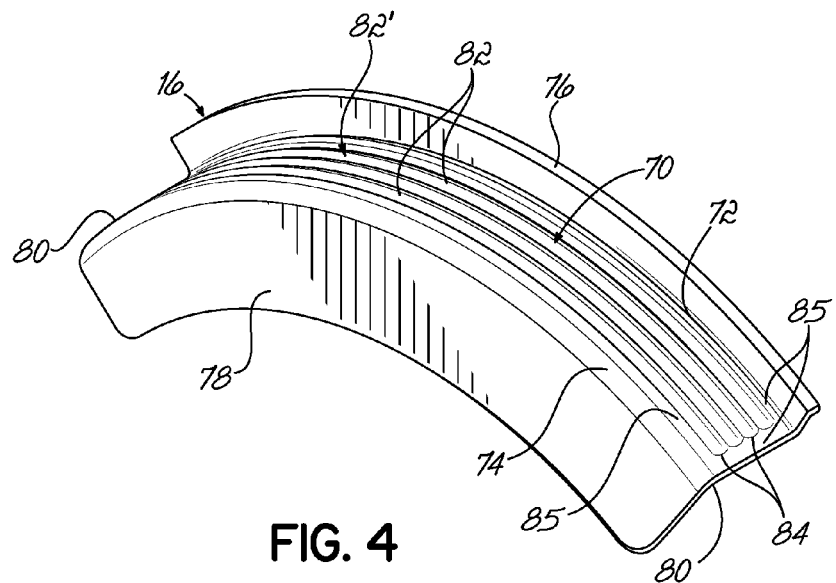
FIG. 4 is a perspective view of one of the armors of FIG. 1.

The armor 16 is more clearly shown in FIGS. 3 and 4. The armor 16 is generally S-shaped in cross section and has an arcuate shape along its length. The armor 16 includes a central wall 70 with an inner side edge 72 and an outer side edge 74. The armor 16 also includes an inner side wall 76 extending generally perpendicular to, and radially inwardly of, the central wall 70 at the inner side edge 72, and an outer side wall 78 extending generally perpendicular to, and radially outwardly of, the central wall 70 at the outer side edge 74. The inner side wall 76 and the outer side wall 78 extend in differing directions from the central wall 70 to form the generally S-shaped cross section of the armor 16. The central wall 70 further includes lateral side edges 80 extending from the inner side edge 72 to the outer side edge 74.

When the armor 16 is positioned at the gap 32 between the spaced ends 30*a*, 30*b* of the gland members 26*a*, 26*b*, the central wall 70 is positioned adjacent the annular walls 60 of the gland members 26*a*, 26*b* at the spaced ends 30*a*, 30*b*. To this end, the central wall 70 of the armor 16 defines an arc length that is at least long enough to span the gap 32 such that the lateral side edges 80 of the central wall 70 are disposed underneath the annular walls 60 of the gland members 26*a*, 26*b* in the nominal position of the split-ring gland 14. In this position, the inner side wall 76 projects into the U-shaped walls 66 of the gland members 26*a*, 26*b*, and the outer side wall 78 is positioned adjacent the outer walls 68 of the gland members 26*a*, 26*b* at the spaced ends 30*a*, 30*b*. Thus, the armor 16 and the split-ring gland 14 collectively define a closed ring or loop for receiving the annular gasket 18. More specifically, the central wall 70 of the armor 16 cooperates with the annular walls 60 of the gland members 26*a*, 26*b* to collectively define the generally closed annular periphery 19 for the annular gasket 18. In the exemplary embodiment, the armor 16 is configured to cover at least about 15% to about 30%, and advantageously, about 20% of the circumference of the gasket 18 when the gasket 18 is installed in the split-ring gland 14.

Shown most clearly in FIG. 4, the central wall 70 includes a plurality of corrugations 82 extending between the lateral side edges 80 and generally parallel to the inner and outer side edges 72, 74. Advantageously at least three or four such corrugations may be provided, although more or fewer may be provided depending on the width of the central wall 70 between the inner and outer side edges 72, 74. Furthermore, corrugations 82 advantageously extend radially outwardly from central wall 70, but could additionally or alternatively extend radially inwardly therefrom. In any event, the corrugations 82 may be seen as defining a corrugated portion 82' of the armor 16. The armor 16 may be formed by cold forming stainless steel, although the armor 16 may be formed in other ways. In that regard, at least corrugations 82 of the exemplary embodiment are advantageously instilled in the armor 16 by cold forming. The cold forming process provides increased structural strength for the armor 16, including increased tensile strength and work hardening. Furthermore, the corrugations 82 provide increased bending stiffness and an improved mechanical performance in the assembly of the pipe coupling 10. The corrugations 82 reduce the surface area of the central wall 70 that contacts the annular walls 60 of the split-ring gland 14 and the annular gasket 18. As such, the armor 16 more freely moves or slides with less friction against the split-ring gland 14 and the annular gasket 18 when the split-ring gland 14 is tightened to compress the annular gasket 18. In this regard, less lubrication or no lubrication is necessary between these components of the pipe coupling 10 in operation.

Corrugations 82 each advantageously taper as at 84 into the central wall 70 so as to stop short of either or both of the lateral side edges 80 and are also generally inboard of the inner and outer side edges 72, 74 so as to define one or more non-corrugated portions 85. The non-corrugated portions 85 extend inwardly from respective ones of the inner side edge 72, the outer side edge 74, and/or the lateral side edges 80 toward the corrugations 82. Where non-corrugated portions 85 are provided between each of the edges 72, 74, and 80, they cooperate to, in effect, define a frame about the corrugations 82. Advantageously, the corrugations 82 do not extend into one or both of the lateral side edges 80, such that the lateral side edge(s) 80 provide a linear edge for the armor 16 to confront and slide between the annular walls 60 of the split-ring gland 14 and the annular gasket 18. It will be appreciated, however, that working of the armor 16 to instill the corrugations 82 may cause some portions of the lateral side edge(s) 80 to distort. Moreover, the tapers 84 may extend into or against the lateral edge(s) 80 or the corrugations 82 may extend all the way to the lateral sides edge(s) 80. Unexpectedly, the inclusion of the corrugations 82, especially where they stop short of the lateral side edges 80, reduces the tendency of the elastomeric material of the annular gasket 18 to bunch up at the lateral side edges 80. Thus, the corrugations 82 significantly improve the performance of the armor 16 as compared to conventional, completely uncorrugated bridge plates or armors.

Figure 5:
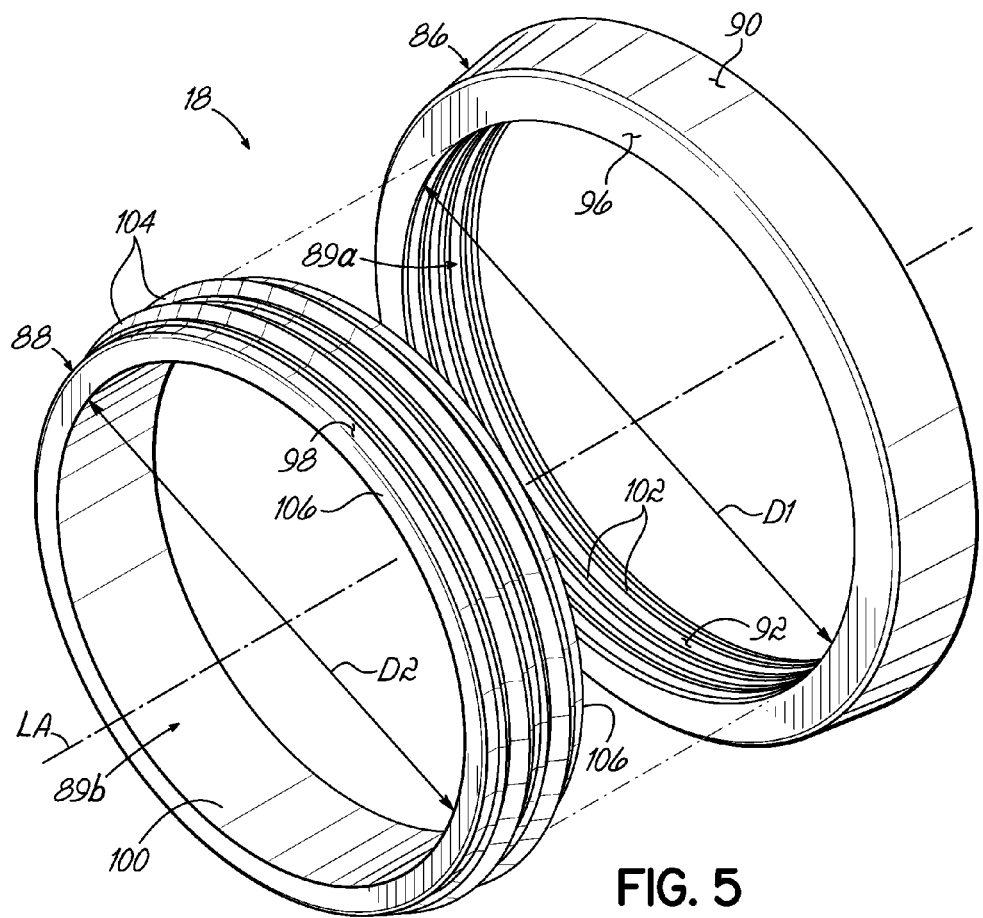
FIG. 5 is an exploded perspective view of a gasket used with the pipe coupling of FIG. 1.
Figure 6:
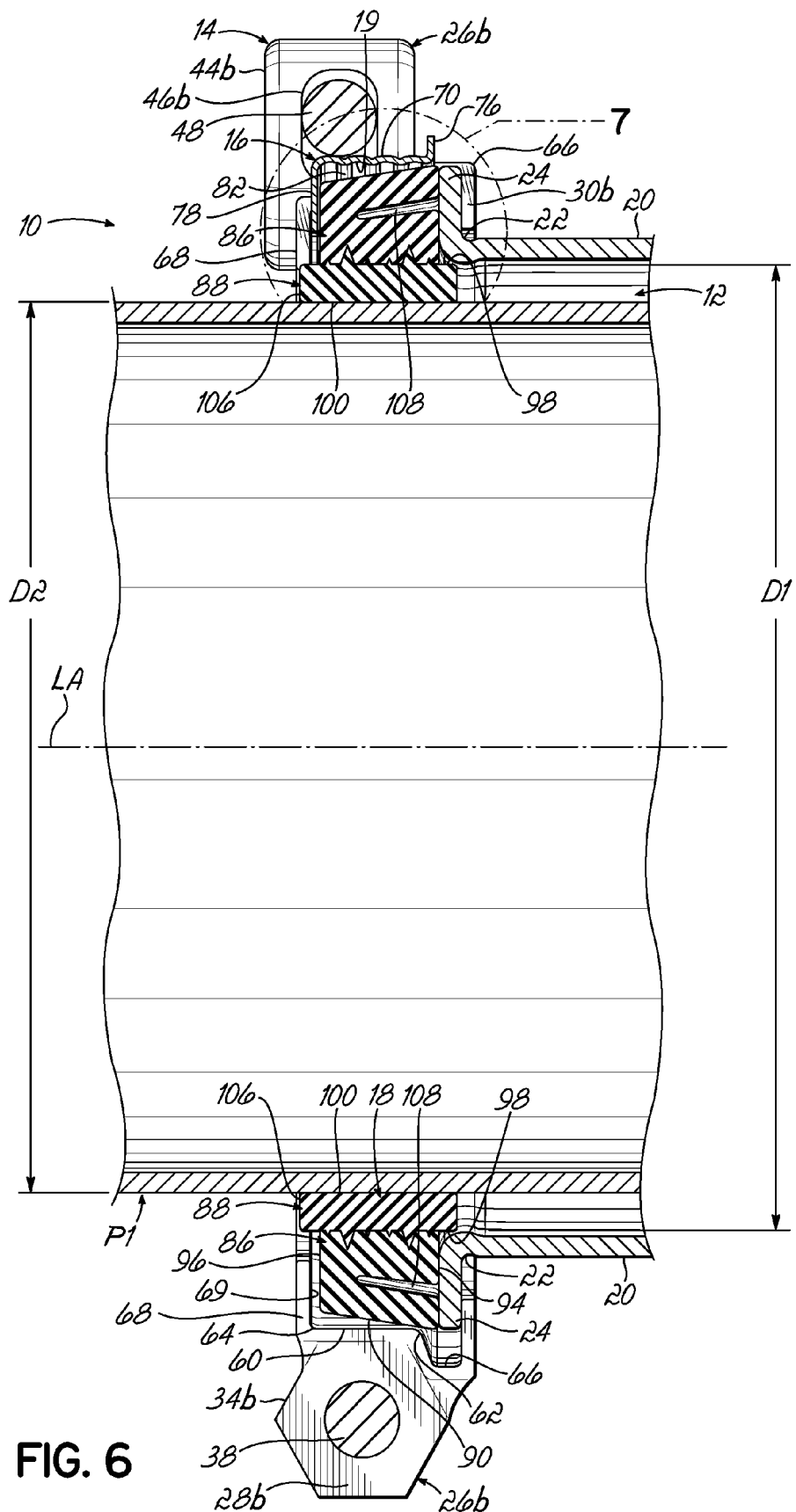
FIG. 6 is a partial cross-sectional view of one end of the pipe coupling of FIG. 1 taken along line 6-6 in FIG. 1 with one of the pipes of FIG. 2 inserted into the pipe coupling.
Figure 7:
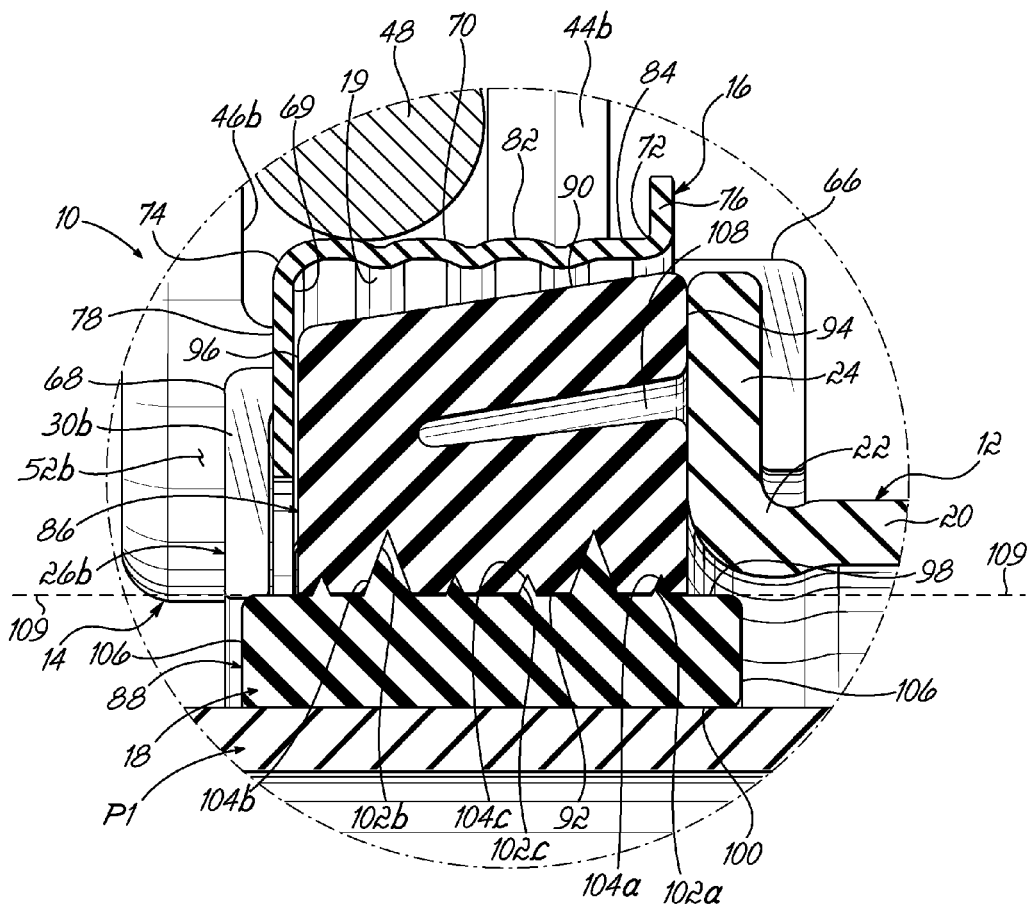
FIG. 7 is an enlarged partial cross-sectional view of one end of the pipe coupling and pipe of FIG. 6, showing details of the gasket and armor thereat.

The annular gasket 18 of the exemplary embodiment is further illustrated in FIGS. 5 through 7. The annular gasket 18 includes an annular outer gasket 86 and a separate annular inner gasket 88 reusably coupled to (i.e., repeatedly insertable into and removable from) the outer gasket 86. The annular gasket 18 defines a gasket opening 89*b* therethrough centered on the longitudinal axis LA when the pipe coupling 10 is assembled. Each of the outer gasket 86 and the inner gasket 88 are composed of an elastomeric material such as rubber. The outer gasket 86 is configured to engage the split-ring gland 14 and the armor 16 along an outer circumferential surface 90, and has an inner circumferential surface 92 configured to engage either the inner gasket 88 or the respective pipe end E1, E2 (when the inner gasket 88 is removed). The inner gasket 88 is configured to engage the pipe end E1, E2 inserted into the pipe coupling 10 and the inner circumferential surface 92 of the outer gasket 86 as will be described in greater detail below.

As shown most clearly in FIGS. 6 and 7, the outer gasket 86 includes the outer circumferential surface 90 facing the gland members 24*a*, 24*b* and the inner circumferential surface 92 facing the inner gasket 88 (or the respective pipe end E1, E2 when the inner gasket 88 is removed). The inner circumferential surface defines a first opening 89*a* (FIG. 5) having a diameter D1. The outer gasket 86 also includes an inner side surface 94 extending between the outer and inner circumferential surfaces 90, 92 and facing the sleeve 12, and an outer side surface 96 extending between the outer and inner circumferential surfaces 90, 92 and facing away from the sleeve 12. The outer circumferential surface 90 may be beveled such that the inner side surface 94 is longer than the outer side surface 96 to form a wedge-shaped configuration for the outer gasket 86. Similarly, the inner gasket 88 includes an outer circumferential surface 98 facing the outer gasket 86 and an inner circumferential surface 100 facing the pipe end E1, E2 or in an inward radial direction. The inner circumferential surface defines an opening 89*b* (FIG. 5) having a second, smaller diameter D2.

The inner gasket 88 may be selectively disengaged from the outer gasket 86 and removed from the pipe coupling 10 to modify an effective range of pipe outer diameters that may be sealed by and accommodated within the pipe coupling 10. In other words, the removable inner gasket 88 enables modification of an effective diameter of the pipe coupling 10 at the split-ring gland 14. For example, diameter D2 may allow the pipe coupling 10 to receive a pipe end E1 or E2 having an outer diameter (OD) in the range of 6.56 inches to 7.05 inches due to the presence of the inner gasket 88. However, removal of the inner gasket 88 leaves the opening 89*a* of diameter D1 which may allow the pipe coupling 10 to thus receive a pipe end E1 or E2 having an OD in the range of 7.05 inches to 7.65 inches. As will be appreciated, however, the diametrical dimensions and ranges of the split-ring gland 14 and the gasket 18 may be modified in other embodiments for pipes of different size ranges.

To facilitate reusable coupling of the inner gasket 88 to the outer gasket 86, the outer gasket 86 and the inner gasket 88 have corresponding interdigitated surfaces. More particularly, the inner circumferential surface 92 of the outer gasket 86 includes a plurality of first interdigitations 102 configured to engage a corresponding plurality of second interdigitations 104 formed on the outer circumferential surface 98 of the inner gasket 88. The engagement of the interdigitations 102, 104 discourages relative axial movement between the inner and outer gaskets 88, 86. The interdigitations 102, 104 are configured to be symmetrical such that the inner gasket 88 and the outer gasket 86 may be engaged without regard to orientation of the inner gasket 88. More specifically, the inner gasket 88 may be inserted into the outer gasket 86 in a first orientation along the longitudinal axis LA or a second orientation along the longitudinal axis LA wherein the inner gasket is reversed from the first orientation.

Also, because the outer gasket 86 and the inner gasket 88 are held together merely by the interdigitations 102, 104, the inner gasket 88 may be readily removed from and reinserted into the outer gasket 86 if the pipe end E1, E2 to be engaged by the annular gasket 18 has an OD within the smaller range provided above. For example, if a user (not shown) concludes that diameter D2 is too small for the intended pipe end E1 to be sealed by the pipe coupling 10, the inner gasket 88 may be removed by grabbing the inner gasket 88 along any side and pulling radially inwardly such that the interdigitations 102, 104 disengage along that side. The inner gasket 88 may then be pulled or torqued out of engagement with the remainder of the outer gasket 86 by pulling the partially-disengaged inner gasket 88 along the longitudinal axis LA out of the outer gasket 86. If, upon further examination, it is determined that diameter D1 is too large, and diameter D2 would actually suffice, the inner gasket 88 may be recoupled to the outer gasket 86 by reversing the steps described above.

In the illustrated embodiment, the first interdigitations 102 include several triangular cross-section annular grooves: two triangular-shaped shallow grooves 102a adjacent outer edges of the ring, two deeper triangular-shaped grooves 102b inboard of the outer shallow grooves 102a, and two additional triangular-shaped shallow grooves 102c inboard of the deeper grooves 102b. It will be appreciated that first interdigitations 102 may alternatively be formed with different shapes (i.e., circular), different depths (i.e., all grooves having a uniform depth), and with different numbers of grooves as opposed to the embodiment shown. In another alternative embodiment, the first interdigitations 102 may include a single concave smooth surface at the inner circumferential surface 92 of the outer gasket 86. Likewise, the second interdigitations 104 include several triangular cross-section annular projections 104a, 104b, 104c sized and positioned to mate with the shallow and deeper grooves forming the illustrated first interdigitations 102. It will be further appreciated that other types of projections or a single smooth concave surface could be provided for second interdigitations 104 to match the various alternatives described above for the first interdigitations 102. Alternatively, the first interdigitations 102 may be projections and the second interdigitations 104 may be grooves in other embodiments.

By positioning the inner gasket 88 within the outer gasket 86 with the projections 104 aligned with the grooves 102, the outer and inner gaskets 86, 88 are held together by their own resiliency, although the gaskets 86, 88 may be easily separated by pulling the inner gasket 88 inwardly in a radial direction and then away from the outer gasket 86. To this end, the inner gasket 88 is generally wider in an axial direction than the corresponding axial width of the outer gasket 86. The inner gasket 88 therefore includes lips 106 projecting beyond the inner and outer side surfaces 94, 96 of the outer gasket 86, the lips 106 facilitating easy gripping and movement of the inner gasket 88 inwardly radially away from the outer gasket 86 when the inner gasket 88 is to be removed from the pipe coupling 10.

The inner circumferential surface 100 of the inner gasket 88 is generally smooth or planar such that the inner gasket 88 provides a reliable seal on the pipe end E1 or E2 sized to work with diameter D2 and composed of various materials. However, the inner circumferential surface 100 may be provided with ribs, projections, or grooves similar to the interdigitations 102, 104 to provide an improved sealing connection with the pipe end E1 or E2 formed from semi-porous material such as cement. Similarly, with inner gasket 88 removed for use with the pipe end E1 or E2 sized to work with diameter D1, the first interdigitations 102 on the inner circumferential surface 92 of the outer gasket 86 may also improve the sealing connection with the pipe end E1 or E2 formed from semi-porous material. With any of these alternatives, the split-ring gland 14 is configured to be tightened sufficiently such that the inner gasket 88 or the outer gasket 86 forms a reliable seal around the corresponding pipe end E1, E2.

As shown in FIG. 7, the outer gasket 86 is configured to seat securely within the gasket seat 69 formed by the split-ring gland 14, the armor 16, and the flange 24 of the sleeve 12. In operation, the outer circumferential surface 90 of the outer gasket 86 seats against the annular walls 60 of the gland members 26a, 26b and the central wall 70 of the armor 16. The inner side surface 94 of the outer gasket 86 is positioned adjacent to the flange 24 of the sleeve 12, and the outer side surface 96 of the outer gasket 86 is positioned adjacent to the outer walls 68 of the gland members 26a, 26b and the outer side wall 78 of the armor 16. When the split-ring gland 14 compresses the outer gasket 86 inwardly, the outer gasket 86 seals the pipe coupling 10 from leakage adjacent the flange 24 of the sleeve 12 and adjacent the split-ring gland 14.

The outer gasket 86 may also include a nominally-open, nearly horizontal, annular slot 108 extending into the outer gasket 86 from the inner side surface 94 and towards the outer side surface 96. The slot 108 is advantageously continuous and angled at a shallow angle (e.g., 8.5°) from a plane 109 defined by the inner circumferential surface 92, and angled such that the slot 108 traverses radially inwardly as the slot 108 extends from the inner side surface 94 towards the outer side surface 96. The slot 108 is advantageously continuous and uninterrupted about the gasket opening 89b at the inner side surface 94. The slot 108 is positioned to aim towards the sleeve 12 and faces the corresponding flange 24 of the sleeve 12. Consequently, if pressurized fluid in the pipes P1, P2 begins to pass between the inner side surface 94 of the outer gasket 86 and the flange 24 on the sleeve 12, the pressurized fluid will enter the slot 108 and press outwardly on the outer gasket 86 at the slot 108. This additional force applied at the slot 108 further enhances the sealing connection of the outer gasket 86 to the split-ring gland 14, the armor 16, and the flange 24 of the sleeve 12. The angle and orientation of the slot 108 may be modified in other embodiments.

In the exemplary embodiment of the outer gasket 86 shown in FIG. 7, the slot 108 may have a length of approximately 0.75 inches when the outer gasket 86 has an axial width of 1.25 inches. The first interdigitations 102 or grooves may be spaced at regular 0.2 inch intervals and may define internal angles of about 40° to 45°. Additionally, the radial thickness of the outer gasket 86 may be in the range of about 0.75 inches to 1.0 inch. The radial thickness of the inner gasket 88 may be about 0.25 inches to enable the differing pipe OD ranges described above. It will be understood that these exemplary dimensions may be modified for differing sizes of pipe ends E1, E2 and pipe couplings 10.

Figure 8:
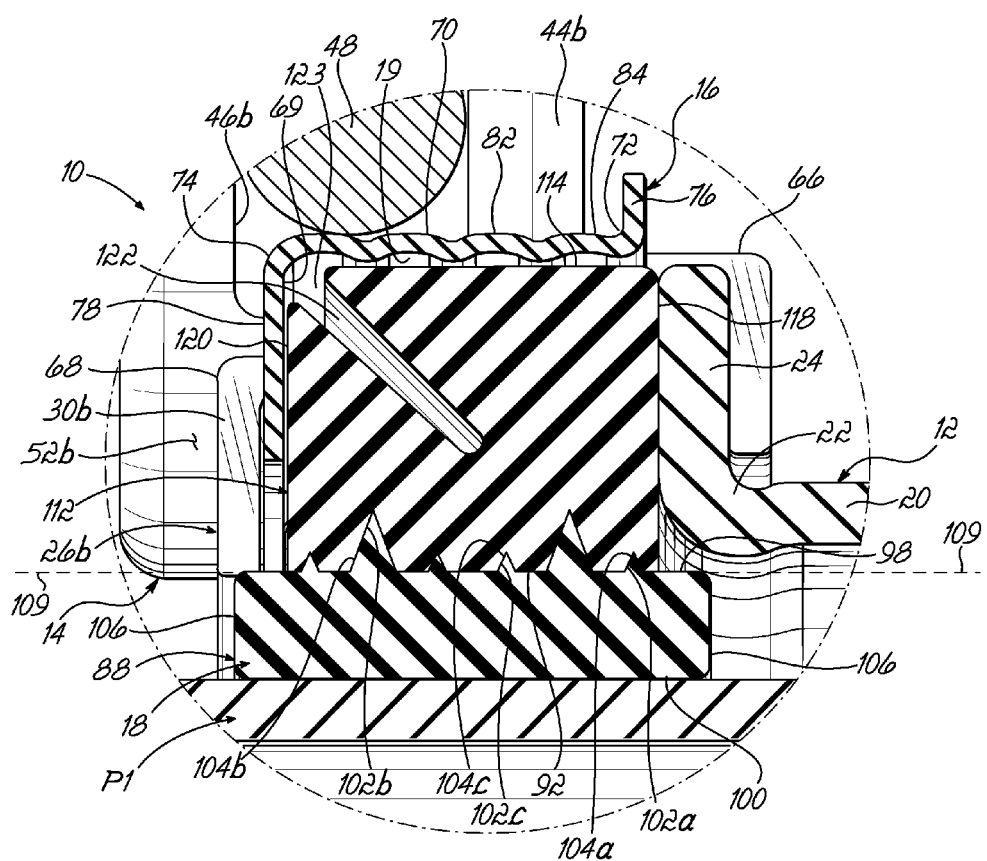
FIG. 8 is an enlarged partial cross-sectional view of one end of the pipe coupling and pipe of FIG. 6, including a different gasket configuration.

With reference to FIG. 8, another embodiment of an outer gasket 112 for use with the inner gasket 88 is shown. The outer gasket 112 of this embodiment again includes an outer circumferential surface 114, an inner circumferential surface 116, an inner side surface 118, and an outer side surface 120. Once again, the inner circumferential surface 116 includes the plurality of first interdigitations 102 to enable coupling with the inner gasket 88 as previously described. In contrast with the previous embodiment, the inner side surface 118 and the outer side surface 120 are of the same length such that the outer gasket 112 defines a generally rectangular shape. Additionally, the nearly horizontal slot 108 is omitted and an angled slot 122 is added. The angled slot 122 extends into the gasket 112 at the junction 123 between the outer circumferential surface 114 and the outer side surface 120 at about an angle of 45° from each of the outer circumferential surface 114 and the outer side surface 120. As the split-ring gland 14 is tightened, the gland members 26a, 26b tend to rotate slightly in cross section such that the outer side edge 120 of the outer gasket 112 is slightly more compressed than the inner side edge 118 of the outer gasket 112. The angled slot 122 utilizes this uneven compression to create a wedging action on the portion of the outer gasket 112 disposed inwardly from the angled slot 122, which thereby improves the sealing connection of the annular gasket 18. In all other regards, the outer gasket 112 of this embodiment operates similarly as the outer gasket 86 of the previous embodiment.

Although the angled slot 122 is angled at a relatively steep angle (e.g., 45°) from the outer circumferential surface 114, the angle and orientation of the slot 122 may be modified in other embodiments. In the embodiment of the outer gasket 112 shown in FIG. 8, the angled slot 122 may have a length of approximately 0.875 inches when the outer gasket 112 has an axial width of 1.25 inches. The first interdigitations 102 or grooves may be spaced at regular 0.2 inch intervals and may define internal angles of about 40° to 45°. Additionally, the radial thickness of the outer gasket 112 may be in the range of about 0.75 inches to 1.0 inch. It will be understood that these exemplary dimensions may be modified for differing sizes of pipe ends E1, E2 and pipe couplings 10. Additionally, it will be understood that the angled slot 122 may be used in combination with the nearly horizontal slot 108 in other embodiments of the outer gasket.

To assemble the pipe coupling, two split-ring glands 14 are assembled with the armors 16 and the gaskets 18 on the opposing open ends 22 of the sleeve 12. For each of the split-ring glands 14, the two gland members 26a, 26b are brought together such that the U-shaped wall 66 of the split-ring gland 14 is engaged or seated onto the flange 24 at one open end 22 of the sleeve 12. The abutting ends 28a, 28b of the gland members 26a, 26b are securely coupled in gap free relationship with the bolt 38 and nut 40. Securely coupling the abutting ends 28a, 28b in this manner will provide a nominal gap 32 between the spaced ends 30a, 30b. The bolt 38 and nut 40 are oriented tangential to the gland members 26a, 26b and therefore restrain the gland members 26a, 26b from scissoring outwardly at the spaced ends 30a, 30b and increasing the length of the gap 32 from the nominal. The armor 16 is inserted to span the gap 32 between the spaced ends 30a, 30b of the gland members 26a, 26b and to form a generally closed annular periphery 19 with the gland members 26a, 26b. The annular gasket 18 is inserted into the closed annular periphery 19 of the armor 16 and the first and second gland members 26a, 26b. Alternatively, the armor 16 may be sitting on the gasket 18 and the gland members 26a, 26b may be brought together over the flange 24, the armor 16, and the gasket 18 simultaneously. In this position, the gasket 18 engages the corrugated portion 82 of the armor 16. The spaced ends 30a, 30b may be coupled by the elongate bolt 48 and nut 50. The elongate bolt 48 and nut 50 may be loosely engaged to leave the nominal gap 32 or, alternatively, may be tightened to begin compressing the gasket 18. The pipe coupling 10 may be packed and shipped in this assembled state in one embodiment.

Alternatively, each of the split-ring glands 14 may be assembled with the corresponding armor 16 and gasket 18 as described above without seating the U-shaped wall 66 of the split-ring gland 14 onto the flange 24 of the sleeve 12. In this assembly, the split-ring glands 14 may be shipped separately from the sleeve 12 and may be assembled with the sleeve 12 at a jobsite. The split-ring glands 14 will need to be loosened and mounted on the corresponding flanges 24 of the sleeve 12 at the jobsite in these embodiments. Any of the above-described assembly steps may be undone and repeated as required during installation and/or removal of the pipe coupling 10.

In use, the assembled pipe coupling 10 is operable to couple the pipe end E1 into fluid communication with the pipe end E2. With reference to FIG. 2, the pipe end E1 of the first pipe P1 is inserted through the gasket opening 89 of a first split-ring gland 14 and through one open end 22 into the sleeve 12 (arrow 134). The pipe end E2 of the second pipe P2 is inserted through the gasket opening 89 of a second split-ring gland 14 and through the other open end 22 into the sleeve 12 (arrow 135). The elongate bolt 48 and nut 50 of the first split-ring gland 14 is tightened to shorten the gap 32 between the spaced ends 30a, 30b thereof (arrows 136) and thereby generally uniformly compress the corresponding annular gasket 18 into sealed engagement with the first pipe P1. The elongate bolt 48 and nut 50 of the second split-ring gland 14 is tightened to shorten the gap 32 between the spaced ends 30a, 30b thereof (arrows 137) and thereby generally uniformly compress the corresponding annular gasket 18 into sealed engagement with the second pipe P2. Each pipe P1, P2 may be inserted into the sleeve 12 prior to tightening the split-ring glands 14, or one pipe (e.g., P1) may be inserted and tightened into position before the other pipe (e.g., P2) is inserted and tightened into position. Advantageously, the corrugations 82 of the armors 16 reduce the frictional engagement of the armors 16 with the corresponding annular gaskets 18 as the gaskets 18 are compressed. Thus, the annular gaskets 18 do not tend to bunch up on the armors 16 even with minimal lubrication in the split-ring glands 14.

In some applications, the first pipe P1 may be of a smaller diameter than the second pipe P2. To accommodate the larger diameter pipe (e.g., P2), the inner gasket 88 of the annular gasket 18 may need to be removed. The corresponding interdigitations 102, 104 of the inner gasket 88 and the outer gasket 86 are disengaged from each other so that the inner gasket 88 may be removed from the split-ring gland 14. More particularly, the inner gasket 88 is pulled radially inwardly away from the outer gasket 86 along any side so that the corresponding interdigitations 102, 104 are disengaged thereat. The inner gasket 88 may then be pulled along the longitudinal axis LA to torque the remainder of the interdigitations 102, 104 out of engagement as the inner gasket 88 moves away from the outer gasket 86. The larger pipe P2 may be inserted through the gasket opening 89 defined by the outer gasket 86 and through the open end 22 of the sleeve 12, and the corresponding split-ring gland 14 may tightened the outer gasket 86 into sealing engagement with the larger pipe P2. If a larger pipe is to be replaced with a smaller pipe, or if it is determined that the larger pipe is not so large as to seal into just the outer gasket 86, the inner gasket 88 may be re-inserted back into the outer gasket 86 by reversing the disengagement steps described above to accommodate the smaller diameter. The inner gasket 88 may be inserted back into the outer gasket 86 in the original orientation or in a reversed orientation along the longitudinal axis LA of the pipe coupler 10 because the corresponding interdigitations 102, 104 are symmetrical. Each of these steps may be repeated to use the pipe coupling 10 on pipes P1, P2 of different sizes.

Figure 9:
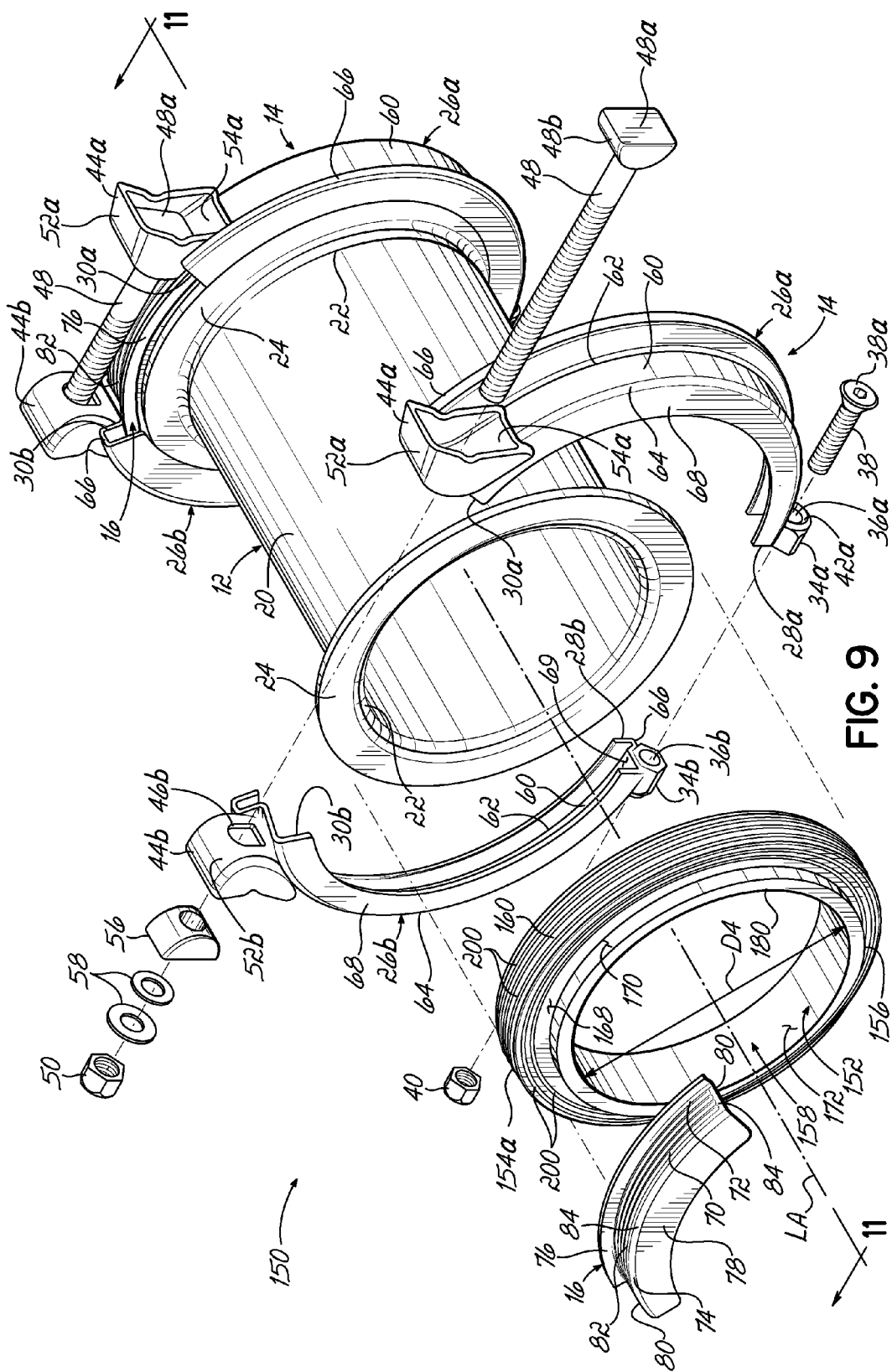
FIG. 9 is partially-exploded perspective view of a second embodiment of a pipe coupling in accordance with the principles of the present invention.

With reference to FIGS. 9 through 15, these figures illustrate a second embodiment of a pipe coupling 150 according to the principles of the present invention. For example, FIG. 9 illustrates the pipe coupling 150 with one of the split-ring glands 14 shown partially exploded to facilitate discussion. It will be understood that all components of the pipe coupling 150 are identical to those described above with reference to the first embodiment of the pipe coupling 10, with the exception of the annular gasket 152. Accordingly, the same reference numbers have been used on non-gasket elements where those identical elements appear in the drawings without further description herein.

Figure 10:
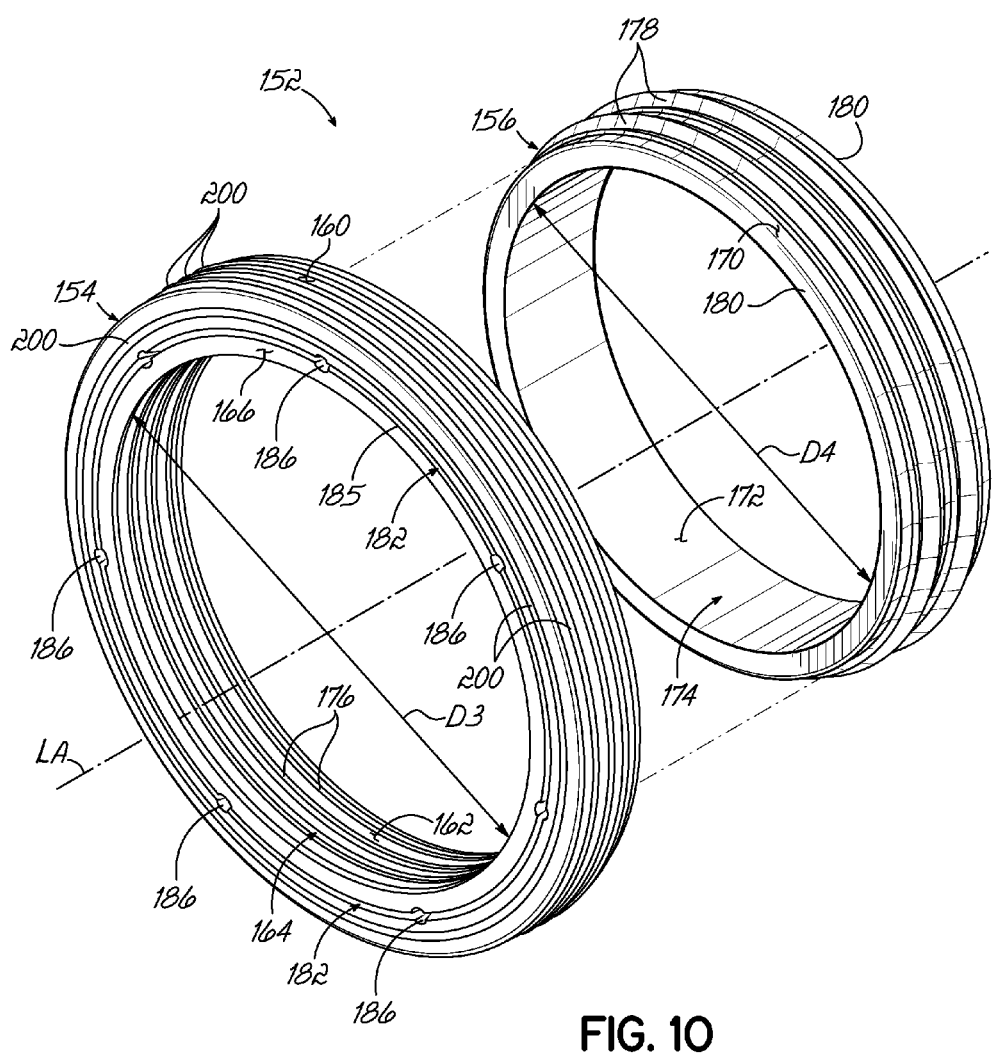
FIG. 10 is an exploded perspective view of a gasket used with the pipe coupling of FIG. 9 in a reverse orientation from FIG. 9, illustrating the pressure assist slot and the plurality of cross grooves formed in the inner side surface of the gasket.

The modified annular gasket 152 of this embodiment is shown in further detail in FIGS. 9 and 10, with FIG. 10 showing the gasket 152 in a reversed orientation from the view shown in FIG. 9. The annular gasket 152 includes an annular outer gasket 154 and a separate annular inner gasket 156 reusably coupled to (i.e., repeatedly insertable into and removable from) the outer gasket 154. It will be understood that the annular inner gasket 156 of this embodiment may be identical to the annular inner gasket 88 previously described. The annular gasket 152 defines a gasket opening 158 therethrough centered on the longitudinal axis LA when the pipe coupling 150 is assembled. Each of the outer gasket 154 and the inner gasket 156 are composed of an elastomeric material such as rubber. The outer gasket 154 is configured to engage the split-ring gland 14 and the armor 16 along an outer circumferential surface 160, and has an inner circumferential surface 162 configured to engage either the inner gasket 156 or the respective pipe end E1, E2 (when the inner gasket 156 is removed). The inner gasket 156 is configured to engage the pipe end E1, E2 inserted into the pipe coupling 150 and the inner circumferential surface 162 of the outer gasket 154 as will be described in greater detail below.

The outer gasket 154 includes the outer circumferential surface 160 facing the gland members 24a, 24b and the inner circumferential surface 162 facing the inner gasket 156 (or the respective pipe end E1, E2 when the inner gasket 156 is removed). The inner circumferential surface 162 defines a first opening 164 (FIG. 10) having a diameter D3. The outer gasket 154 also includes an inner side surface 166 extending between the outer and inner circumferential surfaces 160, 162 and facing the sleeve 12, and an outer side surface 168 extending between the outer and inner circumferential surfaces 160, 162 and facing away from the sleeve 12. The inner and outer side surfaces 166, 168 may each be acutely angled from the inner circumferential surface 162 (e.g., intersect at an 85° angle) such that the inner circumferential surface 162 is longer than the outer circumferential surface 160 to form a generally trapezoidal-shaped configuration for the outer gasket 154. Similarly, the inner gasket 156 includes an outer circumferential surface 170 facing the outer gasket 154 and an inner circumferential surface 172 facing the pipe end E1, E2 or in an inward radial direction. The inner circumferential surface 172 defines an opening 174 (FIG. 10) having a second, smaller diameter D4. The inner gasket 156 defines a generally rectangular-shaped configuration as shown.

Similar to the previous embodiment, the inner gasket 156 may be selectively disengaged from the outer gasket 154 and removed from the pipe coupling 150 to modify an effective range of pipe outer diameters that may be sealed by and accommodated within the pipe coupling 150. In other words, the removable inner gasket 156 enables modification of an effective diameter of the pipe coupling 150 at the split-ring gland 14. To facilitate reusable coupling of the inner gasket 156 to the outer gasket 154, the outer gasket 154 and the inner gasket 156 have corresponding interdigitated surfaces. More particularly, the inner circumferential surface 162 of the outer gasket 154 includes a plurality of first interdigitations 176 configured to engage a corresponding plurality of second interdigitations 178 formed on the outer circumferential surface 170 of the inner gasket 156. The engagement of the interdigitations 176, 178 discourages relative axial movement between the outer and inner gaskets 154, 156. The interdigitations 176, 178 are configured to be symmetrical such that the inner gasket 156 and the outer gasket 154 may be engaged without regard to orientation of the inner gasket 156. More importantly, this engagement and removal of the inner gasket 156 may be repeated anytime the necessary pipe diameter to be held by the pipe coupling 150 changes.

By positioning the inner gasket 156 within the outer gasket 154 with the interdigitations 176, 178 aligned, the outer and inner gaskets 154, 156 are held together by their own resiliency, although the gaskets 154, 156 may be easily separated by pulling the inner gasket 156 inwardly in a radial direction and then away from the outer gasket 154. To this end, the inner gasket 156 is generally wider in an axial direction than the corresponding axial width of the outer gasket 154. The inner gasket 156 therefore includes lips 180 projecting beyond the inner and outer side surfaces 166, 168 of the outer gasket 154, the lips 180 facilitating easy gripping and movement of the inner gasket 156 inwardly radially away from the outer gasket 154 when the inner gasket 156 is to be removed from the pipe coupling 150.

Figure 12:
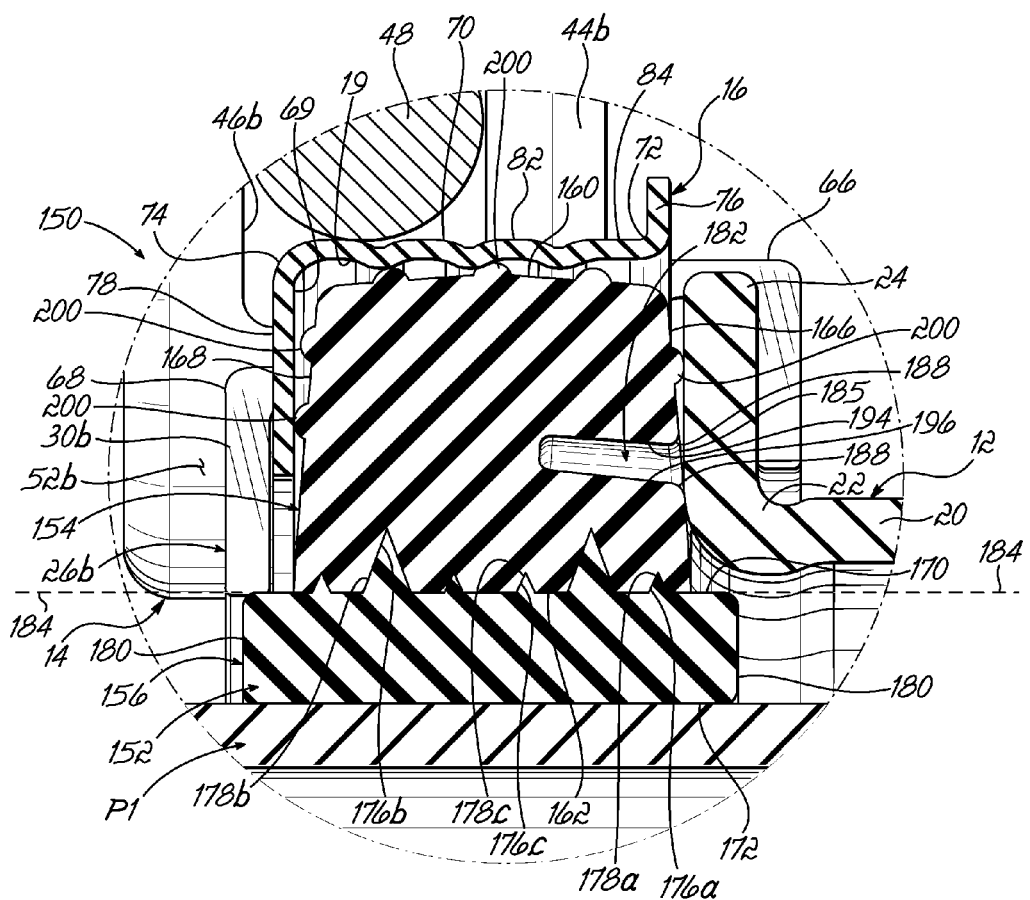
FIG. 12 is an enlarged partial cross-sectional view of one end of the pipe coupling and pipe of FIG. 11, showing details of the gasket and armor thereat.

In the illustrated embodiment and as most clearly shown in FIG. 12, the first interdigitations 176 include several triangular cross-section annular grooves: two triangular-shaped shallow grooves 176a adjacent outer edges of the ring, two deeper triangular-shaped grooves 176b inboard of the outer shallow grooves 176a, and two additional triangular-shaped shallow grooves 176c inboard of the deeper grooves 176b. It will be appreciated that first interdigitations 176 may alternatively be formed with different shapes (i.e., circular), different depths (i.e., all grooves having a uniform depth), and with different numbers of grooves as opposed to the embodiment shown. Likewise, the second interdigitations 178 include several triangular cross-section annular projections 178a, 178b, 178c sized and positioned to mate with the shallow and deeper grooves forming the illustrated first interdigitations 176. It will be further appreciated that other types of projections could be provided for second interdigitations 178 to match the various alternatives described above for the first interdigitations 176. Alternatively, the first interdigitations 176 may be projections and the second interdigitations 178 may be grooves in other embodiments.

Figure 11:
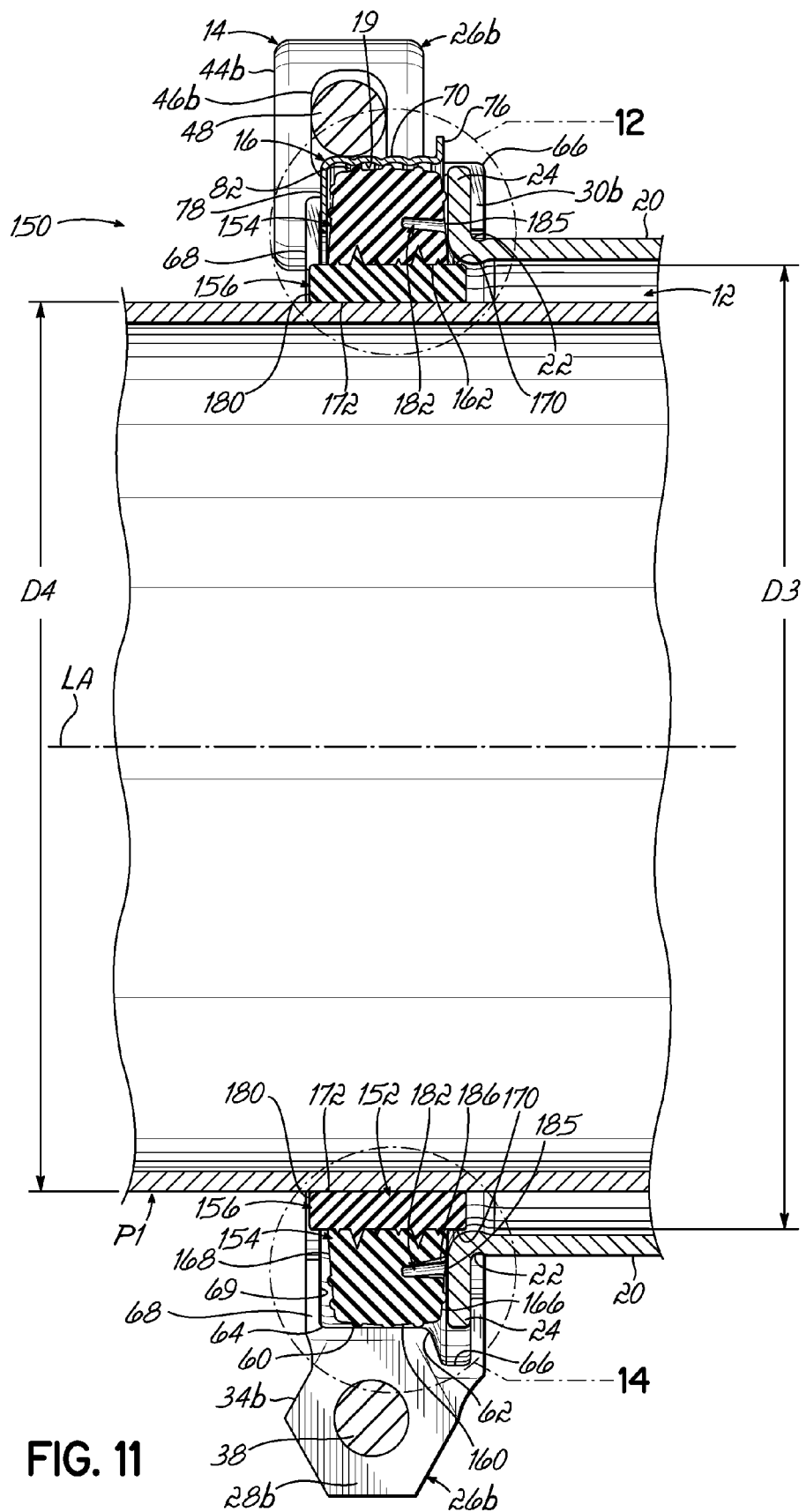
FIG. 11 is a partial cross-sectional view of one end of the pipe coupling of FIG. 9 taken along line 11-11 in FIG. 9 with one of the pipes of FIG. 2 inserted into the pipe coupling.

As shown most clearly in FIGS. 10 through 12, the outer gasket 154 also includes a nominally-open, nearly horizontal, annular pressure assist slot 182 extending into the outer gasket 154 from the inner side surface 166 and towards the outer side surface 168. The pressure assist slot 182 is advantageously angled at a shallow angle (e.g., 5°) from a plane 184 defined by the inner circumferential surface 162 such that the pressure assist slot 182 traverses radially outwardly as the pressure assist slot 182 extends from the inner side surface 166 towards the outer side surface 168. In this regard, the pressure assist slot 182 is angled slightly towards the gasket opening 158 and is aimed at the corresponding flange 24 of the sleeve 12. The pressure assist slot 182 includes a slot opening 185 at the inner side surface 166 that is advantageously continuous and uninterrupted about the gasket opening 158 at the inner side surface 166. Consequently, if pressurized fluid in the pipes P1, P2 begins to pass between the inner side surface 166 of the outer gasket 154 and the flange 24 on the sleeve 12, the pressurized fluid will enter the pressure assist slot 182 through the slot opening 185 and press outwardly on the outer gasket 154 at the pressure assist slot 182. This additional force applied at the pressure assist slot 182 further enhances the sealing connection of the outer gasket 154 to the split-ring gland 14, the armor 16, and the flange 24 of the sleeve 12. The angle and orientation of the pressure assist slot 182 may be modified in other embodiments.

Although the slot opening 185 is shown in these figures as being directly adjacent to the flange 24 of the sleeve 12, it will be understood that the particular positioning of the slot opening 185 with respect to the sleeve 12 may be modified in other embodiments depending on various factors, including the size of the pipe and whether the inner gasket 156 is used. For example, the slot opening 185 may be positioned adjacent the junction of the flange 24 and the cylindrical body portion 20 of the sleeve 12 in other embodiments to thereby more readily communicate with fluid from the pipe(s). This arrangement is particularly advantageous when the pipe coupling 150 is used with smaller pipes because the additional enhancement of the sealing connection caused by fluid pressure applied at the pressure assist slot 182 is even more relevant in these circumstances to forming a reliable seal with the pipe.

In accordance with one aspect of the present invention, the outer gasket 154 includes a plurality of cross grooves 186 in the form of indentations located coextensive with the slot opening 185 of the pressure assist slot 182 at the inner side surface 166. To this end, the cross grooves 186 are provided adjacent to and extending into the slot opening 185 at the inner side surface 166. More particularly, each cross groove 186 intersects with the slot opening 185 at the inner side surface 166 and also extends radially outward and/or radially inward from the slot opening 185 at the inner side surface 166. In this regard, each of the cross grooves 186 defines a radially extending pathway from the slot opening 185 along the inner side surface 166, but are recessed beyond the inner side surface 166 to provide an alternative fluid communication path into the pressure assist slot 182. Thus, the cross grooves 186 enable continued flow of pressurized fluid into the pressure assist slot 182 after compression of the annular gasket 152 with the split-ring gland 14, as explained in further detail below.

In one example, each of the cross grooves 186 is molded at the same time as the pressure assist slot 182 rather than separately drilled, and the coextensive or adjacent placement of the cross grooves 186 with the pressure assist slot 182 enables a single mold part to be used to form these features of the annular gasket 152. This reliable and easy molding process is contrasted with the multiple mold parts or the separate drilling steps which may be required to form the previously-described vent holes in known gaskets. Each of the cross grooves 186 may be oriented generally perpendicular to the pressure assist slot 182 at the inner side surface 166. As a result, when the slot opening 185 of the pressure assist slot 182 is clamped shut at the inner side surface 166 because of compression of the outer gasket 154, the cross grooves 186 extend radially outward and/or radially inward from the annular pressure assist slot 182 to maintain flow into the pressure assist slot 182 from the inner side surface 166. Although seven cross grooves 186 are illustrated in FIG. 10, it will be understood that more or fewer cross grooves 186 may be provided in other embodiments consistent with the current invention. Moreover, it will be understood that the annular pressure assist groove 182 and cross grooves 186 may be used on other gaskets such as single-piece gaskets that do not include the inner gasket 156 described above in accordance with other embodiments of the present invention.

Figure 13:
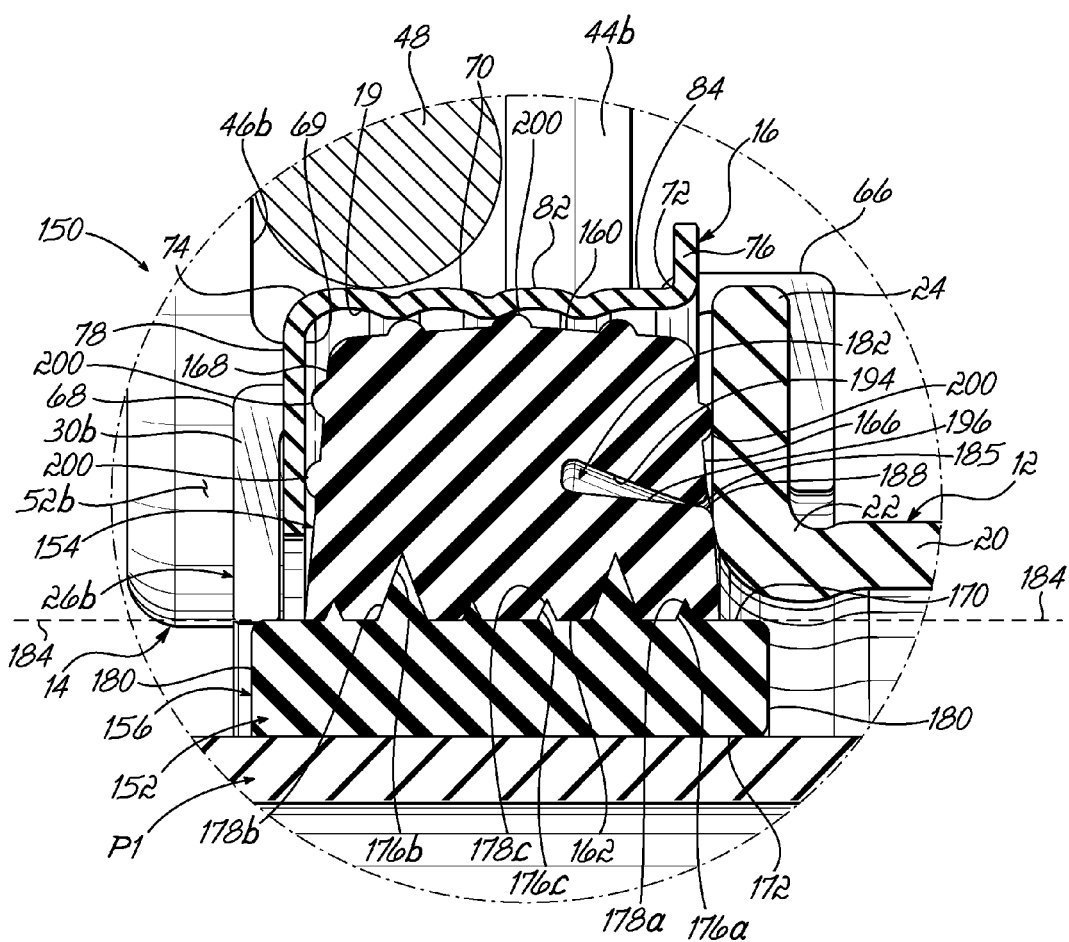
FIG. 13 is an enlarged partial cross-sectional view of one end of the pipe coupling and pipe of FIG. 11 with the gasket clamped so as to close the opening of the pressure assist slot.

A portion of the outer gasket 154 not including a cross groove 186 is shown in an uncompressed state in FIG. 12 and in a compressed state in FIG. 13. In this regard, the pressure assist groove 182 defines a pair of opposing corners 188 adjacent the intersection with the inner side surface 166 and defining the slot opening 185. When the outer gasket 154 is not compressed or only slightly compressed as shown in FIG. 12, these opposing corners 188 remain spaced from one another such that flow of pressurized fluid passing between the flange 24 of the sleeve 12 and the inner side surface 166 will enter the pressure assist slot 182 through the slot opening 185. However, when the outer gasket 154 is compressed by the split-ring gland 14 as shown in FIG. 13, the opposing corners 188 may bend or buckle inwardly into sealing contact with each other, thereby closing the slot opening 185. As a result, any pressurized fluid passing between the flange 24 of the sleeve 12 and the inner side surface 166 at this location is prevented from entering the pressure assist slot 182.

Figure 14:
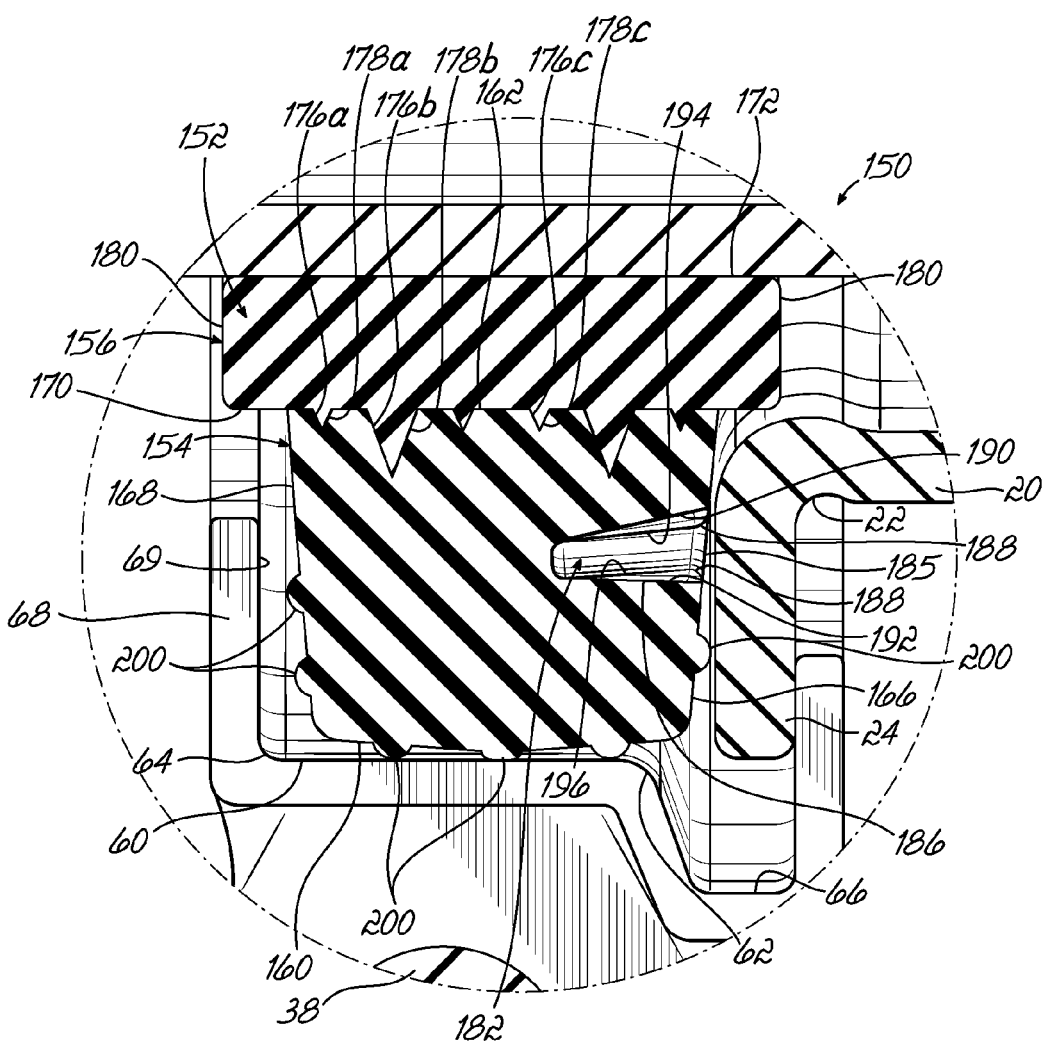
FIG. 14 is another enlarged partial cross-sectional view of one end of the pipe coupling and pipe of FIG. 11, showing details of the gasket thereat.
Figure 15:
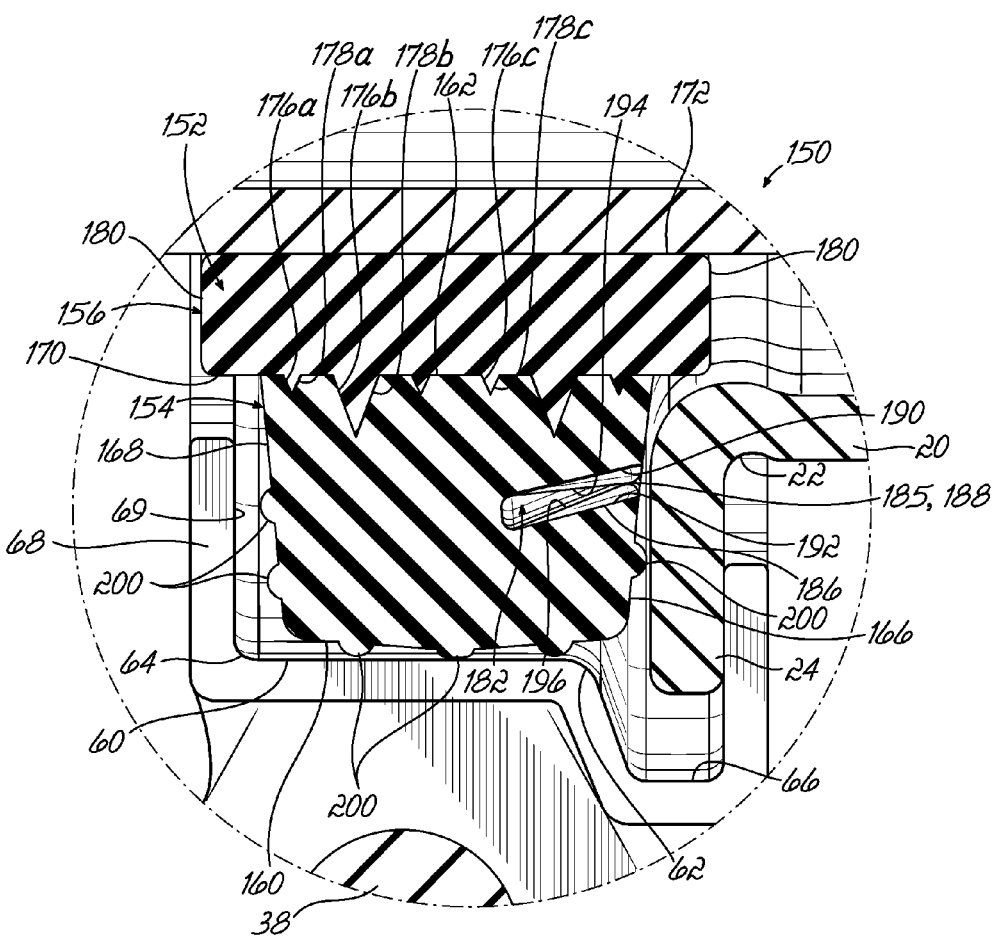
FIG. 15 is an enlarged partial cross-sectional view of one end of the pipe coupling and pipe of FIG. 14 with the gasket clamped so as to close the opening of the pressure assist slot.

By contrast, another portion of the outer gasket 154 that includes one of the cross grooves 186 is shown in an uncompressed state in FIG. 14 and in a compressed state in FIG. 15. As shown in FIG. 14, the cross groove 186 extends radially beyond each of the opposing corners 188 in the illustrated embodiment. More particularly, the cross groove 186 includes first and second opposing sides 190, 192 that collectively define a generally conical indentation shape that tapers inwardly from the inner side surface 166 towards the outer side surface 168. For example, while the corresponding first and second sides 194, 196 of the pressure assist slot 182 may be generally parallel to one another in the uncompressed state, the first and second opposing sides 190, 192 of the cross groove 186 are slightly angled (e.g., by 14°) from one another. It will be appreciated that the positioning, shape, and tapering angle of the cross grooves 186 may be modified in other embodiments consistent with the scope of this invention. For example, the first and second opposing sides 190, 192 may be obliquely molded so as to be parallel to one another yet still located radially beyond the first and second sides 194, 196 of the pressure assist slot 182 in another embodiment consistent with the principles of the present invention. Advantageously, when the outer gasket 154 is compressed by the split-ring gland 14 as shown in FIG. 15, the first and second opposing sides 190, 192 of the cross groove 186 remain spaced from one another despite the corners 188 of the pressure assist slot 182 coming together. Consequently, pressurized fluid passing between the flange 24 of the sleeve 12 and the inner side surface 166 continues to flow through the cross groove 186 to be captured within the pressure assist slot 182 despite the slot opening 185 being clamped shut. Moreover, the pressure assist slot 182 remains pressurized even if the outer gasket 154 is compressed to the extent shown in FIGS. 13 and 15.

Also shown in FIGS. 10 through 15, the outer gasket 154 of this embodiment also includes a plurality of ribs 200 projecting outwardly from the outer circumferential surface 160, the inner side surface 166, and the outer side surface 168. The ribs 200 are configured to engage the corresponding outer side wall 78 of the armor 16, the central wall 70 of the armor 16, and the flange 24 of the sleeve 12. The ribs 200 define a semicircular cross-section in the illustrated embodiment, although other shapes such as triangular are also possible in other embodiments. It will also be understood that more or fewer ribs may be provided on each of these surfaces 160, 166, 168 in alternative embodiments of the pipe coupling 150. Similar to the corrugations 82 on the armor 16, the ribs 200 enhance the sealing contact of the outer gasket 154 against each of the split-ring gland 14, the armor 16, and the flange 24 of the sleeve 12. The ribs 200 also advantageously reduce frictional sliding contact between the outer gasket 154 and the other components during compression of the annular gasket 152 with the split-ring gland 14. When the ribs 200 are provided on the outer gasket 154, the need for lubrication added between the annular gasket 152 and the split-ring gland 14 may be reduced or even eliminated, thus further facilitating installation of the split-ring gland type of coupling 150. Thus, the previously discussed disadvantages of applying a slippery grease or lubricant onto the components of the pipe coupling 150 are overcome with the currently described embodiment.

Advantageously, when the outer gasket 154 of this embodiment includes the plurality of ribs 200 and is combined with a corrugated armor 16 within the split-ring gland 14, the need for lubrication between the annular gasket 152 and the split-ring gland 14 has been found to be eliminated. To this end, the combination of these features prevents the bunching up of the annular gasket 152 on the split-ring gland 14 or on the armor 16 as the annular gasket 152 is compressed. It will be understood that the plurality of ribs 200 may be provided on other annular gaskets without one or both of the inner gasket 156 (i.e., a single layer gasket) and the pressure assist slot 182 in other embodiments consistent with the scope of the present invention.

As shown most clearly in FIG. 11, the outer gasket 154 is configured to seat securely within the gasket seat 69 formed by the split-ring gland 14, the armor 16, and the flange 24 of the sleeve 12. In operation, the outer circumferential surface 160 of the outer gasket 154 seats against the annular walls 60 of the gland members 26a, 26b and the central wall 70 of the armor 16. The inner side surface 166 of the outer gasket 154 is positioned adjacent to the flange 24 of the sleeve 12, and the outer side surface 168 of the outer gasket 154 is positioned adjacent to the outer walls 68 of the gland members 26a, 26b and the outer side wall 78 of the armor 16. When the split-ring gland 14 compresses the outer gasket 154 inwardly, the outer gasket 154 seals the pipe coupling 150 from leakage adjacent the flange 24 of the sleeve 12 and adjacent the split-ring gland 14. Furthermore, as described above, the combination of the outwardly-projecting ribs 200 on the outer gasket 154 and the corrugations 82 on the armor 16 collectively enables the split-ring gland 14 to compress the annular gasket 152 without lubrication added between the split-ring gland 14 and the annular gasket 152. Accordingly, the annular gasket 152 of this embodiment advantageously improves the operation and reliability of the pipe coupling 150.

By virtue of the foregoing, there are thus provided an improved armor, an improved gland, and/or an improved annular gasket for the split-ring gland type of pipe couplings in accordance with various aspects of the present invention. While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, an improved armor in accordance with the principles of the first aspect of the present invention may be used with the improved gland and/or improved annular gasket, but could also be used with other glands or gaskets. Moreover, each of the improved gland and the improved annular gasket in accordance with other aspects of the present invention may be used independently of each other. By way of further example, the armor and/or the corrugations 82 may be formed by hot working instead of cold working as will be appreciated by those skilled in the art. In regard to the gaskets, a generally solid outer gasket with no angled slots may be provided in other embodiments of the pipe coupling. Alternatively, an outer gasket with any combination of the nearly horizontal slot 108 of FIG. 7, the angled slot 122 of FIG. 8, and the pressure assist slot 182 of FIG. 12 may be used in accordance with other embodiments of the invention. Although the cross grooves 186 are shown in combination with the pressure assist slot 182 in the illustrated embodiments, these cross grooves 186 may also be used with other slots in the outer gasket, including the nearly horizontal slot 108 and the angled slot 122. Further, only a single gasket rather than a gasket 18 comprised of inner and outer gaskets, may be used. Additionally, the abutting ends 28a, 28b of the gland members 26a, 26b may be attached in other ways, including with a longitudinal bolt or the like, although scissoring of the gland members 26a, 26b may result. Further, while shown as being used to couple two pipe ends via the sleeve 12, only one end thereof might be provided with the split-ring glands 14, armor 16, and/or gasket 18. The cross grooves 186 of the gasket 182 may be used in combination with spaced vent holes in the gasket as well, and these cross grooves 186 and vent holes may be coupled together at the inner side surface 166 in some embodiments. Moreover, the various features of the present invention, including but not limited to the corrugated armor 16, the ribs 200 on the gasket 152, the pressure assist slot 182 and cross grooves 186 of the gasket 152, and the removable inner gasket 156, may be used individually or in any combination to improve the performance of the pipe coupling 10, 150. The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. A pipe coupling for sealingly coupling to a pipe end, comprising:

a sleeve having a generally cylindrical body portion with open opposing ends;

a split-ring gland configured to be positioned around one of the ends of the sleeve and said pipe, the split-ring gland including two partially-circular gland members with abutting ends securely coupled along one side of the split-ring gland and spaced ends along another side of the split-ring gland, the spaced ends defining a gap which is adjustable in length by a first fastener coupling the spaced ends, each gland member further including a partially-cylindrical annular wall;

an armor positioned to span the gap between the spaced ends, the armor including a central wall extending from the annular walls of the gland members and having an arcuate shape and cooperating with the annular walls of the gland members to define a generally closed annular periphery; and an annular gasket including a gasket opening adapted to receive said pipe end, an outer circumferential surface engaging the split-ring gland and the armor, an inner circumferential surface defining the gasket opening, an inner side surface extending between the outer circumferential surface and the inner circumferential surface and directed toward the sleeve, and an outer side surface extending between the outer circumferential surface and the inner circumferential surface and directed away from the sleeve, the annular gasket positioned within the closed annular periphery defined by the split-ring gland and the armor, the annular gasket being radially inwardly compressible by the split-ring gland to seal said pipe end to the pipe coupling as the first fastener shortens the gap between the spaced ends of the gland members, the annular gasket including an annular pressure assist slot having a slot opening located at the inner side surface and facing the sleeve, and the annular gasket further including a plurality of cross grooves adjacent and extending into the slot opening at the inner side surface, each of the plurality of cross grooves also extending at least one of radially outward or radially inward from the slot opening at the inner side surface such that the plurality of cross grooves continues to communicate between the pressure assist slot and the inner side surface when the slot opening is clamped shut by compression of the annular gasket with the split-ring gland.

2. The pipe coupling of claim 1, wherein each of the plurality of cross grooves is formed as an indentation coextensive with the slot opening at the inner side surface.

3. The pipe coupling of claim 2, wherein each of the plurality of cross grooves is oriented generally perpendicular to the pressure assist slot at the inner side surface.

4. The pipe coupling of claim 3, wherein each of the plurality of cross grooves tapers inwardly from the inner side surface towards the outer side surface.

5. The pipe coupling of claim 1, wherein the pressure assist slot is slightly angled from a plane defined by the inner circumferential surface such that the pressure assist slot traverses radially outwardly from the inner side surface towards the outer side surface.

6. The pipe coupling of claim 5, wherein each of the plurality of cross grooves tapers inwardly from the inner side surface towards the outer side surface.

7. The pipe coupling of claim 1, wherein the central wall of the armor includes an inner side edge, an outer side edge, and corrugations extending along the central wall between the inner and outer side edges.

8. The pipe coupling of claim 7, wherein the annular gasket includes a plurality of ribs projecting outwardly from the outer circumferential surface, the outer side surface, and the inner side surface, and wherein the ribs on the annular gasket and the corrugations on the armor collectively enable compression of the annular gasket with the split-ring gland without any lubricant applied between the annular gasket and the split-ring gland.

9. An annular gasket configured to seal a split-ring gland of a pipe coupling onto an end of a pipe, the annular gasket comprising:

an outer circumferential surface configured to engage the split-ring gland;

an inner circumferential surface defining an opening;

an outer side surface extending between the outer circumferential surface and the inner circumferential surface;

an inner side surface extending between the outer circumferential surface and the inner circumferential surface;

an annular pressure assist slot having a slot opening located at the inner side surface; and a plurality of cross grooves adjacent and extending into the slot opening at the inner side surface, each of the plurality of cross grooves extending at least one of radially outward or radially inward from the slot opening at the inner side surface such that the plurality of cross grooves continues to communicate between the pressure assist slot and the inner side surface when the slot opening is clamped shut by compression of the annular gasket with the split-ring gland.

10. The annular gasket of claim 9, wherein each of the plurality of cross grooves is formed as an indentation coextensive with the slot opening at the inner side surface.

11. The annular gasket of claim 10, wherein each of the plurality of cross grooves tapers inwardly from the inner side surface towards the outer side surface.

12. The annular gasket of claim 9, wherein each of the plurality of cross grooves is oriented generally perpendicular to the pressure assist slot at the inner side surface.

13. The annular gasket of claim 12, wherein each of the plurality of cross grooves tapers inwardly from the inner side surface towards the outer side surface.

14. The annular gasket of claim 9, wherein the pressure assist slot is slightly angled from a plane defined by the inner circumferential surface such that the pressure assist slot traverses radially outwardly from the inner side surface towards the outer side surface.

15. The annular gasket of claim 14, wherein each of the plurality of cross grooves tapers inwardly from the inner side surface towards the outer side surface.

16. The annular gasket of claim 9, further comprising:

a plurality of ribs projecting outwardly from the outer circumferential surface, the outer side surface, and the inner side surface, wherein the ribs reduce lubrication necessary for compression of the annular gasket with the split-ring gland.

17. A method of assembling a pipe coupling, comprising:

positioning first and second partially-circular gland members of a split-ring gland such that first ends thereof along one side are in confronting relationship with second ends along another side being spaced apart and such that a U-shaped wall of the split-ring gland is positioned over a first flange of a sleeve configured to receive a pipe end;

placing the first ends into abutting relationship so as to define a nominal gap between the second ends and to define a partially-cylindrical annular wall of the gland members;

inserting an armor with a portion having a plurality of corrugations to span the gap across the second ends so as to form a generally closed annular periphery defined by the partially-cylindrical annular wall of the first and second gland members and the armor;

combining at least one annular gasket with the gland members and the armor in the closed annular periphery such that the corrugations of the armor engage ribs projecting outwardly from the at least one annular gasket, the at least one annular gasket having an annular pressure assist slot with a slot opening and a plurality of cross grooves adjacent to and extending into the slot opening and extending at least one of radially outward or radially inward from the slot opening;

securely coupling the first ends in gap-free relationship with a first fastener with the first flange of the sleeve extending into the U-shaped wall; and coupling the first and second gland members at the spaced ends with a second fastener configured to draw the spaced ends together and compress the annular gasket in the closed annular periphery without applying lubrication between the split-ring gland and the annular gasket.

* * * * *